United States Patent
Portisch et al.

(10) Patent No.: US 11,762,820 B2
(45) Date of Patent: Sep. 19, 2023

(54) AUTOMATIC CONVERSION OF DATA MODELS USING DATA MODEL ANNOTATIONS

(71) Applicant: SAP SE, Walldorf (DE)

(72) Inventors: Jan Portisch, Bruchsal (DE); Bjoern Pantel, Wiesbaden (DE); Benjamin Merkle, Pforzheim (DE); Stephan Schub, Oftersheim (DE); Sandra Bracholdt, Dielheim (DE); Roland Kolata, Walldorf (DE); Michael Hladik, Walldorf (DE); Christoph Meinel, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/887,267

(22) Filed: Aug. 12, 2022

(65) Prior Publication Data
US 2022/0391363 A1    Dec. 8, 2022

Related U.S. Application Data

(63) Continuation of application No. 16/780,481, filed on Feb. 3, 2020, now Pat. No. 11,442,907.

(51) Int. Cl.
*G06F 16/21*     (2019.01)
*G06F 16/28*     (2019.01)
*G06F 16/22*     (2019.01)

(52) U.S. Cl.
CPC .......... *G06F 16/212* (2019.01); *G06F 16/213* (2019.01); *G06F 16/2282* (2019.01); *G06F 16/288* (2019.01)

(58) Field of Classification Search
CPC .. G06F 16/212; G06F 16/2282; G06F 16/288; G06F 16/213
See application file for complete search history.

(56) References Cited

U.S. PATENT DOCUMENTS 5,970,490 A * 10/1999 Morgenstern ......... G06F 16/258
6,460,043 B1 * 10/2002 Tabbara .............. G06F 16/2452
(Continued)

OTHER PUBLICATIONS

G. Karnitis and G. Arnicans, "Migration of Relational Database to Document-Oriented Database: Structure Denormalization and Data Transformation," 2015 7th International Conference on Computational Intelligence, Communication Systems and Networks, Riga, Latvia, 2015, pp. 113-118. (Year: 2015).*

(Continued)

*Primary Examiner* — Matthew J Ellis
(74) *Attorney, Agent, or Firm* — Klarquist Sparkman, LLP

(57) ABSTRACT

Techniques and solutions are described for converting data models between formats, such as between a conceptual data model and a physical data model for a database system, or between a conceptual data model and artefacts to be implemented in the database system. The conceptual data model is annotated with annotations that allow the physical data model or database artefacts to be automatically generated from the conceptual data model. The annotations can reflect relationships between entity types in the physical data model, such as inheritance relationships, header/item relationships, or one-to-one cardinality relationships. Annotations can also indicate attributes that should be added to entity types in the conceptual data model, such as attributes for versioning or data governance, that may not be used in the conceptual data model. Annotations can be used to determine how entity types in the conceptual data model will be denormalized in the physical data model.

20 Claims, 21 Drawing Sheets

(56) References Cited

U.S. PATENT DOCUMENTS

| | | | | |
|---|---|---|---|---|
| 2007/0038651 | A1* | 2/2007 | Bernstein | G06F 16/28 |
| 2008/0301168 | A1* | 12/2008 | Adler | G06F 16/86 |
| | | | | 707/999.102 |
| 2015/0074081 | A1* | 3/2015 | Falter | G06F 16/2433 |
| | | | | 707/713 |
| 2017/0235816 | A1* | 8/2017 | Livshits | G06F 16/2358 |
| | | | | 707/722 |
| 2019/0155930 | A1* | 5/2019 | Fender | G06F 16/2282 |
| 2019/0205773 | A1* | 7/2019 | Ackerman | G06N 5/027 |
| 2020/0125590 | A1* | 4/2020 | Ferrentino | G06F 16/9538 |
| 2021/0240675 | A1 | 8/2021 | Portisch et al. | |

OTHER PUBLICATIONS

"Binary Relationship in Database," retrieved from: https://www.tutorialspoint.com/Binary-Relationship-in-Database, at least as early as Feb. 3, 2020, 3 pages.

"Cardinality (Data Modeling" *Wikipedia*, at least as early as Feb. 3, 2020, 3 pages.

"Conceptual and Logical Data Model Quick Reference," SAP Help Portal, retrieved from: https://help.sap.com/viewer/5cf5d195c910456fb4b080f9f6219c6d/16.6.5/en-US/c8121c3c6e1b1014b1c5a51c89dac64d.html, at least as early as Feb. 3, 2020, 3 pages.

"Conceptual Data Models," retrieved from: https://help.sap.com/doc/saphelp_pd1655_data/16.5.5/en-US/c7/c2d00d6e1b1014b6b4d4276d81c829/content.htm?no_cache=true, at least as early as Feb. 3, 2020, 1 page.

"Data Modeling" SAP, retrieved from: https://www.microway.com.au/catalog/sybase/PowerDesigner%20-%20Data%20Modeling.pdf, Feb. 15, 2017, 84 pages.

"Difference between Header Data and Item Data," STechies, retrieved from: https://www.stechies.com/difference-between-header-data-item-data/, Mar. 21, 2013, 4 pages.

Header and Item data in SAP OData Service, retrieved from: www.saplearners.com/header-and-item-data-in-odata-service/, Dec. 11, 2014, 7 pages.

Logical Data Models, retrieved from: https://help.sap.com/doc/saphelp_pd1655_data/16.5.5/en-US/c7/c2d8256e1b1014b500b2e246798882/content.htm?no_cache=true, at least as early as Feb. 3, 2020, 1 page.

"What is cardinality?" SAP, retrieved from: https://answers.sap.com/questions/2620569/what-is-cardinality.html, Jul. 6, 2007, 2 pages.

"What is Header & Line item tables?" SAP, retrieved from: https://answers.sap.com/questions/8094349/what-is-header-line-item-tables.html, Feb. 3, 2011, 3 pages.

"What is Header Data and What is Item Data?" SAP, retrieved from: https://answers.sap.com/questions/3338498/what-is-header-data-and-what-is-item-data-.html, Dec. 7, 2007, 3 pages.

Li, "When to Use Single Table Inheritance vs Multiple Table Inheritance," retrieved from: https://medium.eom/@User3141592/when-to-use-single-table-inheritance-vs-multiple-table-inheritance-db7e9733ae2e, Mar. 1, 2018, 3 pages.

Sardar, "Some Useful Tables with Header and Item details," SAP, retrieved from: https://blogs.sap.com/2013/07/16/some-useful-tables-with-header-and-item-details/, Jul. 16, 2013, 11 pages.

Solomon, SAP Table Relations, Version 1.0.0, retrieved from: https://www.recercat.cat/bitstream/handle/2072/5419/PFCLopezRuizAnnex3.pdf?sequence=4, at least as early as Feb. 3, 2020, 29 pages.

Statement by Applicant SAP SE regarding Ownership and Inventorship Issues, Jan. 30, 2020, 1 page.

Non-Final Office Action received in U.S. Appl. No. 16/780,481, dated Oct. 28, 2021, 22 pages.

Notice of Allowance received in U.S. Appl. No. 16/780,481, dated May 9, 2022, 10 pages.

Rami, "Mapping Common Errors in Entity Relationship Diagram Design of Novice Designers," Feb. 2021, International Journal of Database Management Systems, vol. 13, No. 1 (2021).

* cited by examiner

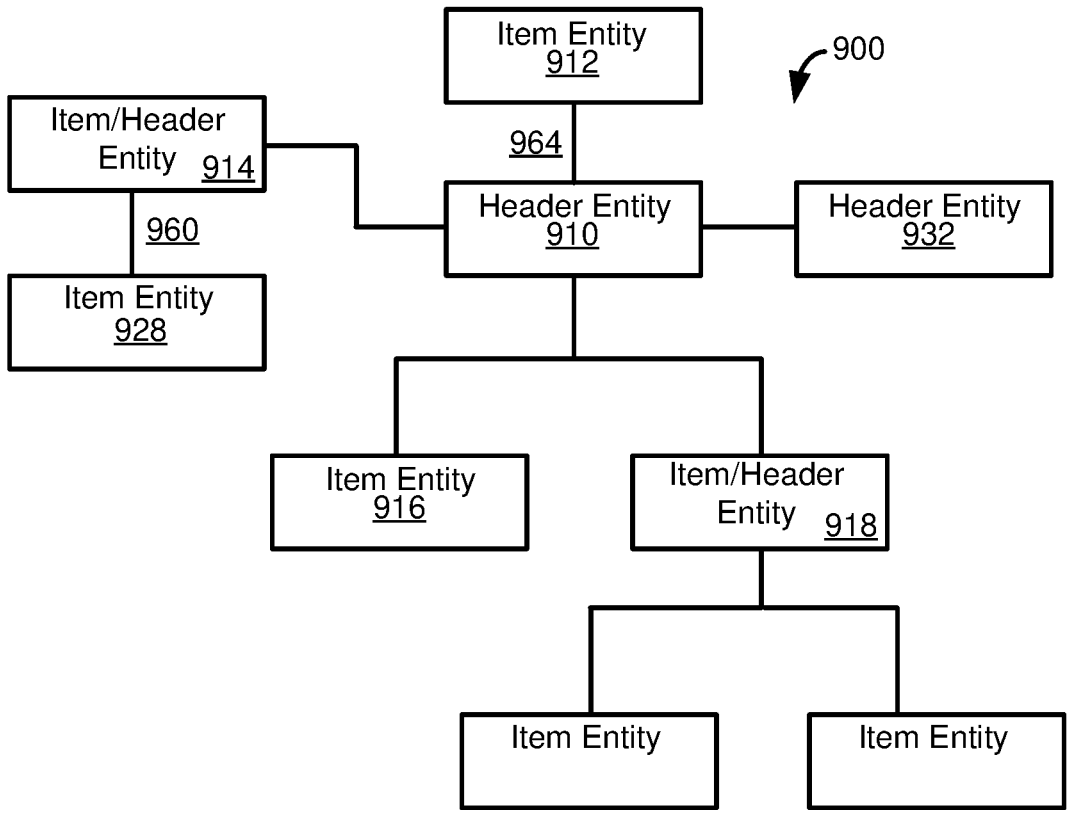

FIG. 9

```
FOR cascadedHeaderItemStructure IN model.getHeaderItemStructures() DO
    root = cascadedHeaderItemStructure.getRoot()
    FOR entity IN cascadedHeaderItemStructure.getEntitiesAsSet() DO
        IF NOT entity.isRoot() DO
            root.addAllAttributes(entity)
            root.addAllRelationships(entity.getRelationships())       1000
            remove(entity)
        END IF
    END FOR
    root.preserveHeaderJoinCondition()
END FOR
```

FIG. 10

```
FOR tree IN model.get1to1trees() DO          1200
    root = tree.getRoot()
    FOR entity IN tree.getEntitiesAsSet() DO
        IF NOT entity.isRoot() DO
            root.addAllAttributes(entity)
            root.addAllRelationships(entity.getRelationships())
            remove(entity)
        END IF
    END FOR
END FOR
```

| Email Address 1310 | | |
|---|---|---|
| EmailAddressType | String(40) | <pk> |
| ASSOC_Partner | Association to Business Partner | <pk,fk> |
| BusinessValidFrom | LocalDate | <pk> |
| BusinessValidTo | LocalDate | <pk> |
| SourceSystemID | String(128) | |
| SystemValidFrom | UTCTimestamp | |
| SystemValidTo | UTCTimestamp | |
| EmailAddress | String(100) | |
| SequenceNumber | Integer | <pk> |
| ChangeTimestampInSourceSystem | UTCTimestamp | |
| ChangingUserInSourceSystem | String(128) | |
| ChangingProcessType | String(40) | |
| ChangingProcessID | String(128) | |

| Email Address 1320 | | |
|---|---|---|
| EmailAddressType | String(40) | <pk> |
| ASSOC_Partner | Association to Business Partner | <pk,fk> |
| BusinessValidFrom | LocalDate | <pk> |
| BusinessValidTo | LocalDate | <pk> |
| SourceSystemID | String(128) | |
| SystemValidFrom | UTCTimestamp | |
| SystemValidTo | UTCTimestamp | |
| NewField | | |
| EmailAddress 1330 | String(100) | |
| SequenceNumber | Integer | <pk> |
| ChangeTimestampInSourceSystem | UTCTimestamp | |
| ChangingUserInSourceSystem | String(128) | |
| ChangingProcessType | String(40) | |
| ChangingProcessID | String(128) | |

| Email Address 1410 | | |
|---|---|---|
| EmailAddressType | String(40) | |
| SequenceNumber | Integer | <pk> |
| BusinessValidFrom | LocalDate | <pk> |
| BusinessValidTo | LocalDate | <pk> |
| ASSOC_Partner | Association to Business Partner | <pk> |
| SystemValidFrom | UTCTimestamp | <pk,fk> |
| SystemValidTo | UTCTimestamp | |
| Email Address | String(100) | |
| SourceSystemID | String(128) | |
| ChangeTimestampInSourceSystem | UTCTimestamp | |
| ChangingUserInSourceSystem | String(128) | |
| ChangingProcessType | String(40) | |
| ChangingProcessID | String(128) | |

| Email Address 1420 | | |
|---|---|---|
| EmailAddressType | String(40) | |
| SequenceNumber | Integer | <pk> |
| BusinessValidFrom | LocalDate | <pk> |
| BusinessValidTo | LocalDate | <pk> |
| ASSOC_Partner | Association to Business Partner | <pk> |
| SystemValidFrom | UTCTimestamp | <pk,fk> |
| SystemValidTo | UTCTimestamp | |
| Email Address | String(100) | |
| SourceSystemID | String(128) | |
| ChangeTimestampInSourceSystem | UTCTimestamp | |
| ChangingUserInSourceSystem | String(128) | |
| ChangingProcessType | String(40) | |
| ChangingProcessID | String(128) | |
| NewField | String(40) | |

```
1500
1504 — For each entity in model.Entities{
          sortKeyFields(entity)          1508
          sortNonKeyFields(entity)
       }
1520 — Function sortKeyFields(entity){    1522
          sortByRelease(entity.PrimaryKeys)                              1524
          sortFieldsWithinSameReleaseByName(entity.PrimaryKeys)
     1526  sortByRelease(entity.ForeignPrimaryKeys)
          sortFieldsWithinSameReleaseByName(entity.ForeignPrimaryKeys)  1528
       }
1530 — Function sortNonKeyFields(entity){ 1532
          sortByRelease(entity.ForeignKeys)                              1534
          sortFieldsWithinSameReleaseByName(entity.ForeignKeys)
     1536  sortByRelease(entity.NonKeyFields)
          sortFieldsWithinSameReleaseByName(entity.NonKeyFields)        1538
       }
```

FIG. 15

```
FOR entity IN model.entities DO
    IF entity.BusinessVersioning THEN
        addBusinessValidFromField(entitiy. BusinessVersioningType)
        addBusinessValidToField(entitiy. BusinessVersioningType)
    END IF
    IF entity.SystemVersioning THEN
        addSystemValidFromField(UTCTimestamp)
        addSystemValidToField(UTCTimestamp)
        htable = new table(entity)
        htable.removeAllKeyfieldsentity()
        htable.setName(entity.name + '_historical')
    END IF
END FOR
```

FIG. 16

| SOURCEENTITYCODE 1810 | SOURCENODETYPE 1820 | TARGET ATTRIBUTE CODE 1830 | TARGETENTITYACODE 1840 | TARGETINHERITANCECODE 1850 | TARGET RELATIONSHIP CODE 1860 |
|---|---|---|---|---|---|
| Timestamp 1814 | IntradayExchangeRateObservation | ATTRIBUTE | Timestamp | IntradayExchangeRateObservation | ATTRIBUTE |
| PriceDataProvider 1814 | EndOfDayExchangeRateObservation | ATTRIBUTE | PriceDataProvider 1814a | ExchangeRateObservation | ATTRIBUTE |
| PriceDataProvider | IntradayExchangeRateObservation | ATTRIBUTE | PriceDataProvider | ExchangeRateObservation | ATTRIBUTE |
| ExchangeRateType | EndOfDayExchangeRateObservation | ATTRIBUTE | ExchangeRateType 1814 | ExchangeRateObservation | ATTRIBUTE |
| ExchangeRateType | IntradayExchangeRateObservation | ATTRIBUTE | ExchangeRateType | ExchangeRateObservation | ATTRIBUTE |
| BaseCurrency | EndOfDayExchangeRateObservation | ATTRIBUTE | BaseCurrency | ExchangeRateObservation | ATTRIBUTE |
| BaseCurrency | IntradayExchangeRateObservation | ATTRIBUTE | BaseCurrency | ExchangeRateObservation | ATTRIBUTE |
| QuoteCurrency | EndOfDayExchangeRateObservation | ATTRIBUTE | QuoteCurrency | ExchangeRateObservation | ATTRIBUTE |
| QuoteCurrency | IntradayExchangeRateObservation | ATTRIBUTE | QuoteCurrency 1814 | ExchangeRateObservation | ATTRIBUTE |
| QuotationType | EndOfDayExchangeRateObservation | ATTRIBUTE | QuotationType | ExchangeRateObservation | ATTRIBUTE |
| QuotationType | IntradayExchangeRateObservation | ATTRIBUTE | QuotationType | ExchangeRateObservation | ATTRIBUTE |
| IntradayExchangeRateCategory | IntradayExchangeRateCategory | ATTRIBUTE | IntradayExchangeRateCategory | IntradayExchangeRateCategory | ATTRIBUTE |
| Open 1814 | EndOfDayExchangeRateObservation | ATTRIBUTE | Open 1814 | EndOfDayExchangeRateObservation | ATTRIBUTE |
| Close | EndOfDayExchangeRateObservation | ATTRIBUTE | Close | EndOfDayExchangeRateObservation | ATTRIBUTE |
| Low | EndOfDayExchangeRateObservation | ATTRIBUTE | Low | EndOfDayExchangeRateObservation | ATTRIBUTE |
| High 1818a | EndOfDayExchangeRateObservation | ATTRIBUTE | High | EndOfDayExchangeRateObservation | ATTRIBUTE |
| IntradayExchangeRateObservation | | ENTITY | IntradayExchangeRateObservation | 1818a | ENTITY |
| EndOfDayExchangeRateObservation 1818b | | ENTITY | ExchangeRateObservation 1818 | | ENTITY |
| IntradayExchangeRateCategory | | ENTITY | IntradayExchangeRateCategory | | ENTITY |
| EndOfDayExchangeRateObservation | | ENTITY | EndOfDayExchangeRateObservation | 1818 | ENTITY |

| SCHEMA ALIGNMENT VERSION | SOURCE SCHEMA CODE | SOURCE SCHEMA VERSION | TARGET SCHEMA CODE | TARGET SCHEMA VERSION |
|---|---|---|---|---|
| NIGHLTY | FSDM_PDM | NIGHTLY | FSDM_CDM | NIGHTLY |

FIG. 19

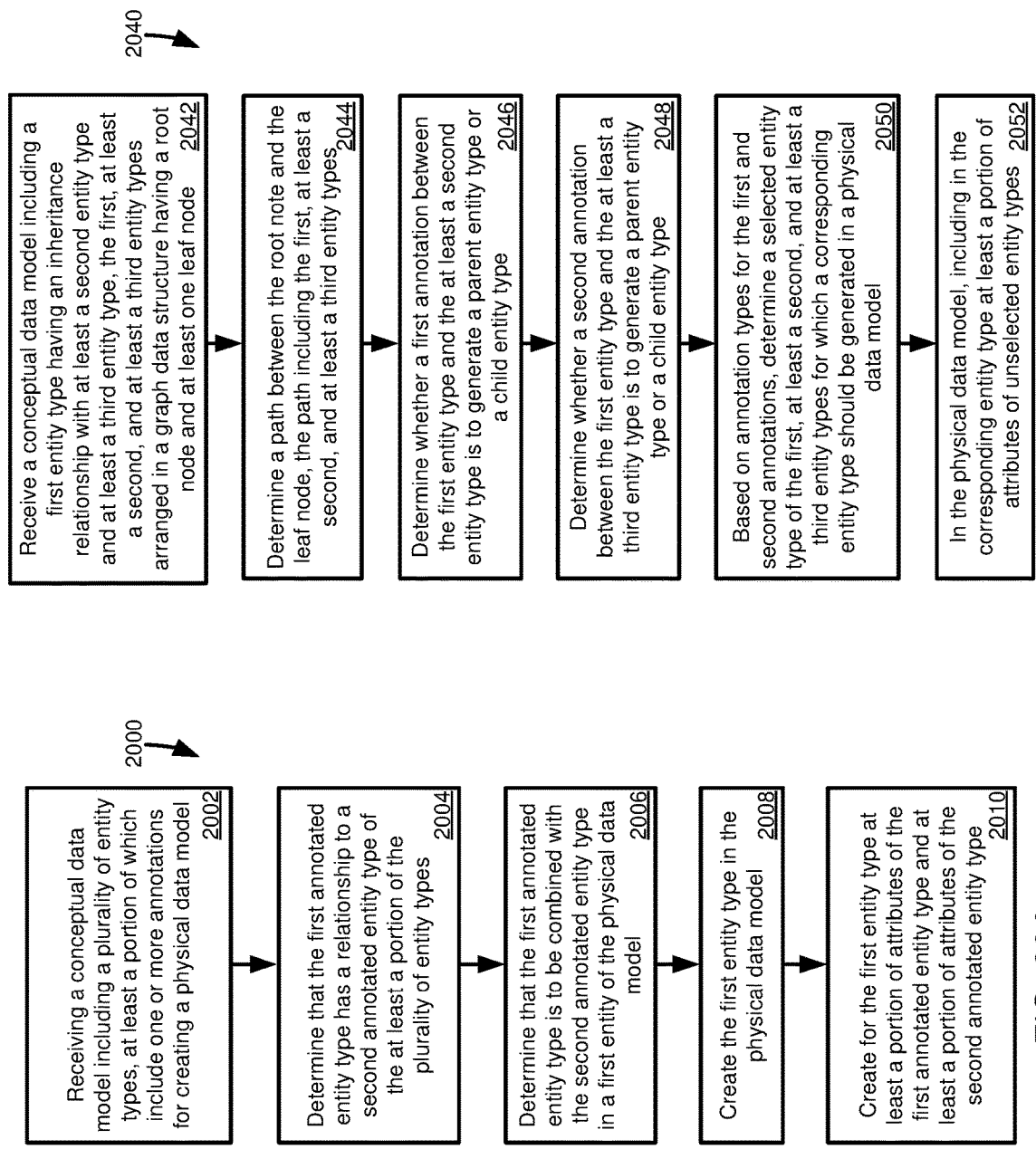

AUTOMATIC CONVERSION OF DATA MODELS USING DATA MODEL ANNOTATIONS

CROSS REFERENCE TO RELATED APPLICATIONS

This application is a continuation of U.S. patent application Ser. No. 16/780,481, filed Feb. 3, 2020, which is hereby incorporated herein by reference.

FIELD

The present disclosure generally relates to converting data models between various formats. Particular implementations relate to automatically converting a conceptual data model to a physical data model, or database artefacts, using annotations provided for the conceptual data model.

BACKGROUND

Databases are critical parts of many computer applications, including mission-critical applications for enterprises. Many databases, such as relational database systems, are intended to model data corresponding to items in the analog world. For example, database tables may be created to represent things like materials, products, customers, employees, sales orders, and the like. Database tables may be related to other database tables. For example, a material may be obtained from a supplier and incorporated into a product. The product may be the subject of sales order with a customer.

Database tables in a database system, and their relationships, can be very complex. It is not uncommon for enterprise level database systems to included hundreds or thousands of individual tables. Typically, a data model, or schema, for data can be constructed at a conceptual level, providing a conceptual data model. A conceptual data model can describe different entity types, and particular attributes that entities of those types will have. For example, a table, or entity type, for an employee can be created, and can have attributes such as name, social security number, job title, and compensation rate. The conceptual data model can also capture relationships between different types of entities.

Although called a conceptual data model, conceptual data models are typically represented in a computer-readable/computer-manipulable format. For example, entity type definitions and relationships can be defined using software, which can store, or reproduce, the conceptual data model. However, the conceptual data model is typically not the data model used to implement data structures or data types, such as tables, in a database system.

Rather, a conceptual data model is typically used to create a physical data model. The physical data model can add attributes, which can be referred to as technical attributes, to the conceptual data model that may not describe a property of an analog world item, but rather may be useful in storing and retrieving data. Artificial primary key values may be created, for instance, that may be useful in distinguishing between particular records/entities in a database table, but which do not directly describe a property of the corresponding analog world item.

A physical data model can be used to generate various database artefacts. For example, table definitions in a physical data model can correspond to, or be used to generate, entries for a table in a data dictionary (or information schema) of a database system. Database artefacts can be, or can be used to produce, statements in a computer language, such as SQL, that can be used to add, modify, or delete tables. In particular, a physical data model can be used to generate a data definition language (DDL) statement that can be used to create an instance of a table having a structure defined in the physical data model.

Maintaining correspondence between a conceptual data model and a physical data model can be problematic. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for converting data models between formats, such as between a conceptual data model and a physical data model for a database system, or between a conceptual data model and artefacts to be implemented in the database system. The conceptual data model is annotated with annotations that allow the physical data model or database artefacts to be automatically generated from the conceptual data model. The annotations can reflect relationships between entity types in the conceptual data model, such as inheritance relationships, header/item relationships, or one-to-one cardinality relationships. Annotations can also indicate attributes that should be added to entity types in the physical data model, such as attributes for versioning or data governance, that may not be used in the conceptual data model. Annotations can be used to determine how entity types in the conceptual data model will be denormalized in the physical data model.

In one aspect, a method is provided for converting a conceptual data model to a physical data model using annotations in the conceptual data model. A conceptual data model is received. The conceptual data model includes a plurality of entity types. At least a portion of the entity types are annotated entity types, where an annotated entity type includes one or more annotations for creating a physical data model from the conceptual data model.

The conceptual data model is automatically processed to produce the physical data model. It is determined that a first annotated entity type has a relationship with a second annotated entity type. It is determined that the first annotated entity type is to be combined with the second annotated entity type in a first entity type of the physical data model. The first entity type is created in the physical data model. For the first entity type, at least a portion of the attributes of the first annotated entity type and at least a portion of attributes of the second entity type are created.

In another aspect, another method is provided for converting a conceptual data model to a physical data model using annotations in the conceptual data model. A conceptual data model is received that includes a first entity type having an inheritance relationship with at least a second entity type and at least a third entity type. The first, at least a second, and at least a third entity types are arranged in a graph data structure that includes a root node and at least one leaf node. A path between the root node and the at least one leaf node is determined. The path includes the first, at least a second, and at least a third entity types.

It is determined whether a first annotation between the first entity type and the at least a second entity type is to generate a parent entity type or a child entity type. It is determined whether a second annotation between the first entity type and the at least a third entity type is to generate a parent entity type or a child entity type. Based on annotation types for the first and second annotations, a selected entity type of the first, at least a second, and at least a third entity types is determined for which a corresponding entity type should be generated in a physical data model. Other entity types of the first, at least a second, and at least a third entity types are unselected entity types. In the physical data model, at least a portion of attributes of the unselected entity types are included in the corresponding entity type.

In a further aspect, an additional method is provided for converting a conceptual data model to a physical data model using annotations in the conceptual data model. A conceptual data model is received for a plurality of annotated entity types. It is determined that at least a first annotated entity type and at least a second annotated entity type are related by inheritance. A first, denormalized, entity type is created in a physical data model, and includes at least a portion of attributes of the at least a first annotated entity type and the at least a second annotated entity type.

It is determined that at least a third annotated entity type and at least a fourth annotated entity type are related by a header/item relationship. A second, denormalized, entity type in the physical data model is created that includes at least a portion of attributes of the at least a third annotated entity type and the at least a fourth annotated entity type.

It is determined that a fifth annotated entity type and a sixth annotated entity type are related by a one-to-one cardinality relationship. A third, denormalized, entity type in the physical data model is created that includes at least a portion of attributes of the at least a fifth annotated entity type and the at least a sixth annotated entity type.

It is determined that a seventh annotated entity type is to be associated with versioning attributes. The versioning attributes are added to a fourth entity type of the physical data model that includes attributes of the seventh annotated entity type. It is determined that an eighth annotated entity type is to be associated with data governance attributes. The data governance attributes are added to a fifth entity type of the physical data model that includes attributes of the eighth annotated entity type.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 9 is a diagram illustrating how item entity types may also serve as header entity types, and how a given entity type may have relationships with multiple other entity types.

FIG. 10 is example pseudocode for processing annotations for header/item entity types.

FIGS. 13A and 13B illustrate versions of an entity type, and their attributes, where the attributes are unsorted.

FIGS. 14A and 14B illustrate versions of an entity type, and their attributes, where the attributes are sorted.

FIG. 15 is example pseudocode for sorting attributes for an entity type.

FIG. 16 is example pseudocode for processing versioning annotations.

FIG. 18 is a table illustrating how data models, including physical data models and conceptual data models, can be mapped to one another.

FIG. 19 is a table illustrating how two data models can be related, such as for producing the table of FIG. 18.

FIGS. 20A-20C are flowcharts illustrating operations in various disclosed technologies.

DETAILED DESCRIPTION

Example 1—Overview

Figure 1:
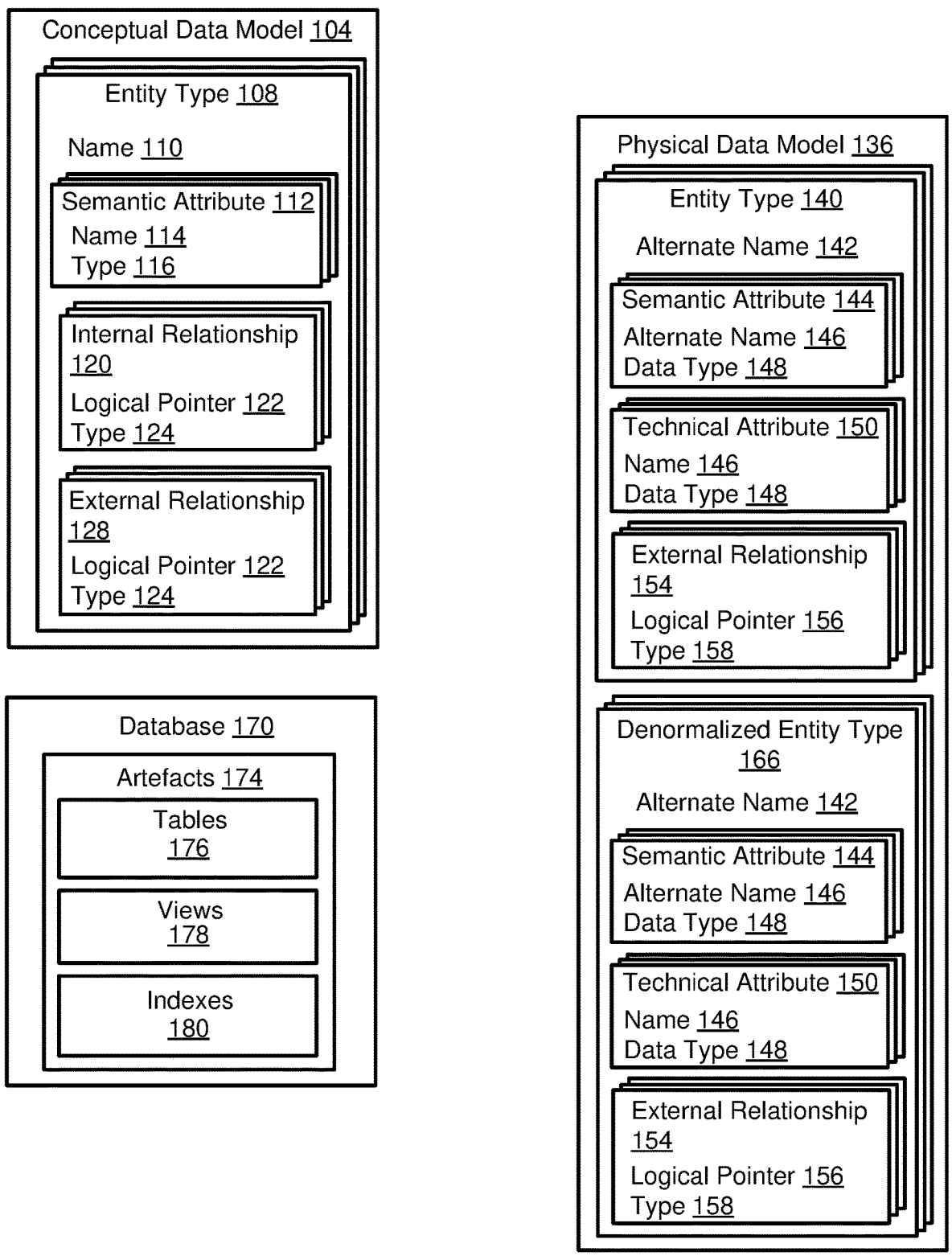
FIG. 1 is a diagram illustrating components of a conceptual data model and how they can have corresponding components in a physical data model or in a database system.

Databases are critical parts of many computer applications, including mission-critical applications for enterprises. Many databases, such as relational database systems, are intended to model data corresponding to items in the analog world. For example, database tables may be created to represent things like materials, products, customers, employees, sales orders, and the like. Database tables may be related to other database tables. For example, a material may be obtained from a supplier and incorporated into a product. The product may be the subject of a sales order with a customer.

Database tables in a database system, and their relationships, can be very complex. It is not uncommon for enterprise level database systems to included hundreds or thousands of individual tables. Typically, a data model, or schema, for data can be constructed at a conceptual level, providing a conceptual data model. A conceptual data model can describe different entity types, and particular attributes that entities of those types will have. For example, a table, or entity type, for an employee can be created, and can have attributes such as name, social security number, job title, and compensation rate. The conceptual data model can also capture relationships between different types of entities. Conceptual data models can be useful, in that tables can have fewer fields than a corresponding table in a physical data model. In addition, tables and fields in a conceptual data model may have more meaningful names than corresponding elements of a physical data model.

Conceptual data models provide other benefits, such as by defining a vocabulary that allows individuals in an enterprise to communicate regarding data that is relevant to the enterprise. A conceptual data model can help understand what types of analyses can be performed, and can guide processes to obtain or manipulate data. For example, if a conceptual data model accurately corresponds to a physical data model, a user may consult the conceptual data model to determine the most efficient join operations to obtain particular data. A complete and accurate data model can also be very useful when migrating to a new database system or schema, including when two or more database systems are being combined.

Although called a conceptual data model, conceptual data models are typically represented in a computer-readable/computer-manipulable format. For example, entity type definitions and relationships can be defined using software, which can store, or reproduce, the conceptual data model. However, the conceptual data model is typically not the data model used to implement data structures or data types, such as tables, in a database system.

Rather, a conceptual data model is typically used to create a physical data model. The physical data model can add attributes, which can be referred to as technical attributes, to the conceptual data model that may not describe a property of an analog world item, but rather may be useful in storing and retrieving data. Artificial primary key values may be created, for instance, that may be useful in distinguishing between particular records/entities in a database table, but which do not directly describe a property of the corresponding analog world item.

A physical data model can be used to generate various database artefacts. For example, table definitions in a physical data model can correspond to, or be used to generate, entries for a table in a data dictionary (or information schema) of a database system. Database artefacts can be, or can be used to produce, statements in a computer language, such as SQL, that can be used to add, modify, or delete tables. In particular, a physical data model can be used to generate a data definition language (DDL) statement that can be used to create an instance of a table having a structure defined in the physical data model.

Maintaining correspondence between a conceptual data model and a physical data model can be problematic. For example, conceptual data models are typically created before a physical data model, used to implement a physical data model, but may be infrequently, and possibly never, synchronized with the physical data model. That is, if changes are needed to a database system, they are often made directly to the physical data model. The changes are often not propagated back to the conceptual data model. Thus, if someone seeks to understand a database system, and looks at the conceptual data model, they are likely to obtain inaccurate/incomplete information. Particularly as physical data models are more complex than conceptual data models, trying to understand how a database system is organized from the physical data model can be difficult.

Problems in understanding a conceptual data model, its corresponding physical data model, and their correspondence can be complicated in that typically very few people, often only a single person, may understand such correspondence. If the person with that knowledge is no longer available, deciphering the data models can be very difficult, particularly if, as described above, the conceptual data model no longer reflects what is implemented in the database system/the physical data model.

Even in a best case scenario where an individual is available who understands both the conceptual data model and the physical data model, making changes to the conceptual data model and then making corresponding changes to the physical data model, or adjusting the conceptual data model to account for changes made to the physical data model, can be very time consuming. In addition, these processes can be error prone even for a knowledgeable individual. Discovering and correcting these errors can be difficult and time consuming. If many manual steps are required in order to make changes to a physical data model, either directly or by first changing a conceptual data model, it may be difficult to quickly adapt a database system for new requirements, including new legal requirements that might be imposed.

The present disclosure provides technologies that allow changes to be automatically made to a database system from a conceptual database model. The conceptual database model can be provided with annotations that allow for the creation of database artefacts, a physical data model, or both. The disclosed technologies can be particularly useful in the context of denormalized database tables. That is, relational database systems are typically organized using various normalization principles, including defining tables in the Boyce-Codd normal form. Database normalization is typically carried out in order to reduce data redundancy or avoid inconsistent dependencies. Among other things, normalized database tables can facilitate updating of data, as when data is updated it only needs to be changed a single time (e.g., in a single table). Normalization can also facilitate understanding how data is organized, including relationships between various entity types. Accordingly, conceptual data models can correspond well to how data will be organized in a physical data model that uses normalized tables.

However, there can be advantages to data denormalization. In particular, for databases that maintain or process data in column format (such as the HANA database of SAP SE, of Walldorf, Germany) data denormalization can reduce storage requirements, as data stored in column format can be compressed using various techniques, such as dictionary compression. In addition, denormalization can reduce the need for table joins, which can reduce computing resource use and speed query execution. However, it can be more difficult to maintain correspondence between a conceptual data model and a physical data model, or between a conceptual data model and the actual computing artefacts used to implement a database system, for denormalized data.

As will be further described, conceptual data models can include a concept of inheritance. That is, it may be useful to define an entity type that serves as a genus and one or more entity types that serve as specific species of the genus. Typically, a child entity type adds certain attributes to a set of attributes provided by a parent entity type. Different types of child entities for a given parent entity type may include one or more attributes that are different. In one aspect, the present disclosure provides for annotating a conceptual data model with inheritance information. The inheritance information can be processed by a computing system to provide a physical data model, database artefacts, or both based at least in part on inheritance annotations to a conceptual data model.

Certain database systems, including those provided by SAP SE, of Walldorf, Germany, provide mechanisms for interrelating components of a database schema. In some cases, multiple records for a table (for a particular entity type) can share particular sets of attributes, while other records in a table may not share the same set of attributes (e.g., they may not have any shared attributes, or their shared attributes can differ at least in part from such other set of records). In addition, a given set of records can share a particular set of values for a particular set of attributes.

In systems provided by SAP SE, these types of relationships can be expressed as header tables and items tables (in this disclosure, entity type and table may sometimes be used interchangeably, although typically the term entity type is preferred for conceptual data models, table is preferred for database artefacts, and either term may be used for physical data models). A header table can provide a set of attributes that can provide additional information regarding records in an item table. Typically, a single record in the header table can be used to described multiple records in the item table. While multiple records in the item table can be assigned the same header record, typically each record in the item table is assigned a single record in the header table (at least with respect to a given header table/set of attributes).

As with inheritance information, header/item table information can be particularly useful in understanding conceptual relationships between data, and thus are used in a conceptual data model. However, for similar reasons as discussed for inheritance information, a physical data model may not include header/item table information. In particular, a denormalization process can be used to merge item table information with header table information. This merge process can include merging information regarding relations possessed by records in a given item table, such as preserving relationships with other tables (e.g., based on inheritance, foreign key relationships, or other types of associations to other database tables). Similarly, when header/item tables are merged in producing a physical data model/database artefacts, it can be important that other tables that reference a merged table are also updated, such as to ensure that join conditions can be fulfilled.

In at least some cases, header information can be cascaded, in that a first item table can reference a first header table, but can serve as second header table for a second item table. These types of cascaded relationships (as well as complexity introduced through inheritance) highlight how translating a conceptual data model to a physical data model can be complex, time consuming, and error prone.

According to disclosed technologies, header/item relationships can be annotated in a conceptual data model. A conversion process can analyze these annotations in producing a physical data model, database artefacts, or both.

To help understand the meaning and relationship of data, it can be useful to split information for a particular type of entity into multiple tables, where at least a portion of the tables have a one-to-one relationship (or cardinality). In tables having one-to-one cardinality, each row in a first table refers to a single row in the other table. In at least some cases, all tables having a one-to-one cardinality relationship can share the same primary key. In disclosed embodiments, a conceptual data model is annotated with directional information, such that one table is marked as primary/dominant, and the other table can be marked as secondary/non-dominant, or such status can be assumed by a lack of annotation. Annotation information can be used to analyze a set of tables having a one-to-one cardinality, such as to determine which serves as the root in tables having a tree-like relationship.

It can be difficult, in some cases, to determine whether attributes in a table have been changed. For example, if table version 1 has a second attribute, Attribute X, and Attribute X is not the second attribute in table version 2, it can be unclear as to whether Attribute X has been deleted from table version 1 in producing table version 2, or if Attribute X just appears at a different position in table version 2 (e.g., being a sixth attribute). Accordingly, in some embodiments, disclosed technologies sort table attributes according to a rule or a set of rules to facilitate identifying changes to a data model, including identifying such changes in an automated manner.

As discussed above, in some cases a physical data model, or database artefacts, include features that are not typically included in a conceptual data model. For example, a physical data model can include data versioning, including whether versioning is used for data analysis purposes by an enterprise or whether versioning is applied at a database system level (e.g., for auditing purposes). Embodiments of the present disclosure annotate a conceptual data model with information about versioning that should be applied in a physical data model/database artefacts.

Similarly, attributes can be added to tables, or definitions of tables in a physical data model, as part of data governance, even though those attributes might not be included in a conceptual data model. A conceptual data model can be annotated with information regarding whether additional, data governance, attributes should be added to tables/table definitions in a physical data model.

Disclosed technologies can provide a number of benefits. As only a conceptual data model need be manually updated, effort in making changes to a database system (e.g., to the database artefacts that are used in the database system) can be reduced, as only a single model need be updated. In addition, the process of updating a database can be less error prone, as the chance for inconsistencies between the conceptual data model, physical data model, and database artefacts is reduced. Because implementing a physical data model/database artefacts is automated, the time needed to implement changes to a database schema can be greatly reduced.

The present disclosure provides a number of techniques for transforming a conceptual data model into a physical data model or database artefacts, including resolving inheritance relationships between entity types, resolving relationships between header entity types and item entity types, denormalizing 1-1 cardinality relationships, sorting attributes for different versions of a data model, adding data governance attributes to a physical data model, adding versioning information to a physical data model, and generating a mapping between a conceptual data model and a physical data model generated therefrom using disclosed technologies. In some cases, these techniques can be use alone, while in other cases they can be used in combination. For example, an integrated process can automatically perform each of these techniques. In other cases, a process for converting a conceptual data model to a physical data model or database artefacts includes one or more of attribute sorting, denormalizing 1-1 cardinality relationships, or generating a mapping between a conceptual data model and a physical data model.

Example 2—Example Conceptual and Physical Data Model Components

FIG. 1 illustrates components typically used in database design. A conceptual data model 104 can include a plurality of entity types 108 (e.g., for customers, materials, invoices, employees, etc.). Each entity type 108 is associated with a name 110, which in the conceptual data model 104 is typically a semantically meaningful, easy to understand name. Each entity type 108 includes one or more, and typically a plurality, of semantic attributes 112. Semantic attributes 112 include a name 114, which is normally a semantically meaningful, easy to understand name, and a type 116. The type 116 can be a general type, such as number, character, date, or currency, and may or not correspond to a data type that is used in a database table that corresponds to a given entity type 108.

A given entity type 108 can optionally be associated with one or more internal relationships 120 or one or more external relationships 128. As used herein, an internal relationship 120 refers to a relationship between two entity types 108 where the relationship is not present in a physical data model representation of a given entity type, or in corresponding database artefacts. Example internal relationships 120 include inheritance, header/item relationships, and one-to-one cardinality relationships. In at least some examples, entity types 108 having internal relationships 120 are denormalized in generating an entity type in a physical data model or a table in a database.

An internal relationship 120 is associated with one or more logical pointers 122 to related entity types 108 (or, in some cases, other types of schema elements of a conceptual data model 104). An internal relationship 120 may also be associated with a type 124, which can identify a given internal relationship as an inheritance relationship, a header/item relationship, etc.

As used herein, an external relationship 128 refers to a relationship between two entity types 108 where the entity types remain distinct in a physical data model/are represented by different database artefacts. Typically, entity types 108 related by external relationships 128 are more semantically different than entity types related by internal relationships 120. Examples of external relationships 128 include foreign key relationships (or joins) and associations. Like internal relationships 120, external relationships 128 include one or more logical pointers 122 to related entity types 108 and optionally include a type 124 for the relationship (e.g., foreign key or association).

As described in Example 1, the conceptual data model 104 can be used to generate a physical data model 136. The physical data model 136 can have entity types 140 that correspond to a single entity type 108 of the conceptual data model 104. In many cases, a name 142 for the entity type 140 is an alternate name that is less semantically meaningful than the name 110 of the corresponding entity type 108 in the conceptual data model 104. For example, in some database systems, names 142 may assigned only a limited number of characters, such as four characters. Thus, in many cases it can be difficult to understand what data in an entity type 140 represents just from the name 142.

An entity type 140 includes one or more (typically a plurality of) semantic attributes 144, which correspond to the semantic attributes 112 of the corresponding entity type 108. However, as with the name 142, a name 146 for a semantic attribute 144 is typically less obviously meaningful than the name 114 of the corresponding semantic attribute 112. As the physical data model 136 is typically useable to generate database artefacts, the semantic attributes 144 can be associated with a data type 148. The data type 148 can be a data type that is useable in a software environment used to implement a database, such as being a string having a defined maximum number of characters, an integer, a specific date format, a decimal value having a defined number of digits before and after a decimal point, etc.

An entity type 140 can also include technical attributes 150. Technical attributes 150 can be useful in implementing a database system, but may not relate to a property of an analog world item that is modelled by a corresponding entity type 108. Examples of technical attributes 150 can include fields used for data governance purposes, such as identifying a source system or particular users or processes that are authorized to change data in a particular entity type 140, or a timestamp indicating a date that a record for the entity type was last modified. The technical attributes 150 can include names 146 and data types 148

An entity type 140 can be associated with one or more external relationships 154. The external relationships 154 can include one or more logical pointers 156 and a type 158. The external relationships 154, logical pointers 156, and type 158 can be at least generally similar to the external relationships 128, logical pointers 122, and types 124 of the conceptual data model 104. However, the values (or data type or other implementation details) of the logical pointers 122 or types 124 can be different for the entity type 140 than for an entity type 108 of the conceptual data model 104. For example, a value assigned to a logical pointer 122 of an entity type 140 can be a name 142 or a name 146 rather than a name 110 or a name 114.

The physical data model 136 can include modified entity types, shown in FIG. 1 as denormalized entity types 166. In particular implementations, a denormalized entity type 166 combines multiple entity types 108 of the conceptual data model 104. For example, a denormalized entity type 166 can include some or all of the entities 108 connected by internal relationships 120.

A denormalized entity type 166 can otherwise be similar to an entity type 140, including a name 142, semantic attributes 144, technical attributes 150, or external relationships 154. The semantic attributes 144 and external relationships 154 can correspond to the semantic attributes 112 and external relationships 128 of the constituent entity types 108 of an entity type 140.

The conceptual data model 104 can also be used to produce artefacts 174 in a database system 170. In some cases, the artefacts 174 can be produced directly from the conceptual data model 104. In other cases, the artefacts 174 can be produced from a physical data model 136 that was produced from a conceptual data model 104. As shown, the artefacts include tables 176, views 178, and indexes 180. Although not shown, the tables 176, views 178, and indexes 180 can be related, and in some cases defined with respect to one another. For example, two or more tables 176 can be related via foreign keys or associations. Views 178 can be defined with respect to one or more tables 176 or views. Indexes 180 can be defined with respect to tables 176 or views 178.

In one embodiment, artefacts 174 for the database system 170 can be produced directly from the conceptual data model 104. For example, the conceptual data model 104 may be processed to generate statements in a data definition language to generate tables 176, views 178, and indexes 180. In another embodiment, artefacts 174 for the database system 170 can be produced from the physical data model 136, such as by generating data definition language statements for entity types 140 in the physical data model. Similar techniques can be used to update database artefacts 174 based on changes to the conceptual data model 104 (e.g., deleting tables 176 and adding new tables having an updated schema, or modifying tables, such as by adding or dropping columns).

In a particular example, table definitions, such as Core Data Services (CDS) definitions, as used in products of SAP SE, of Walldorf, Germany, are generated from a physical data model 136 (which in turn can be automatically generated from a conceptual data model 104 using disclosed technologies). The CDS definitions can be processed by a parser to determine changes from prior versions of the CDS definition (if they exist), and automatically generate statements to create new tables (or other database artefacts) or to modify existing tables (or other artefacts). Updating artefacts to reflect changes can be particularly useful, as it can avoid the loss of data from existing tables (or more complicated or resource-intensive strategies for preserving the data while a new table is created).

Example 3—Example Data Model Conversion Process

Figure 2:
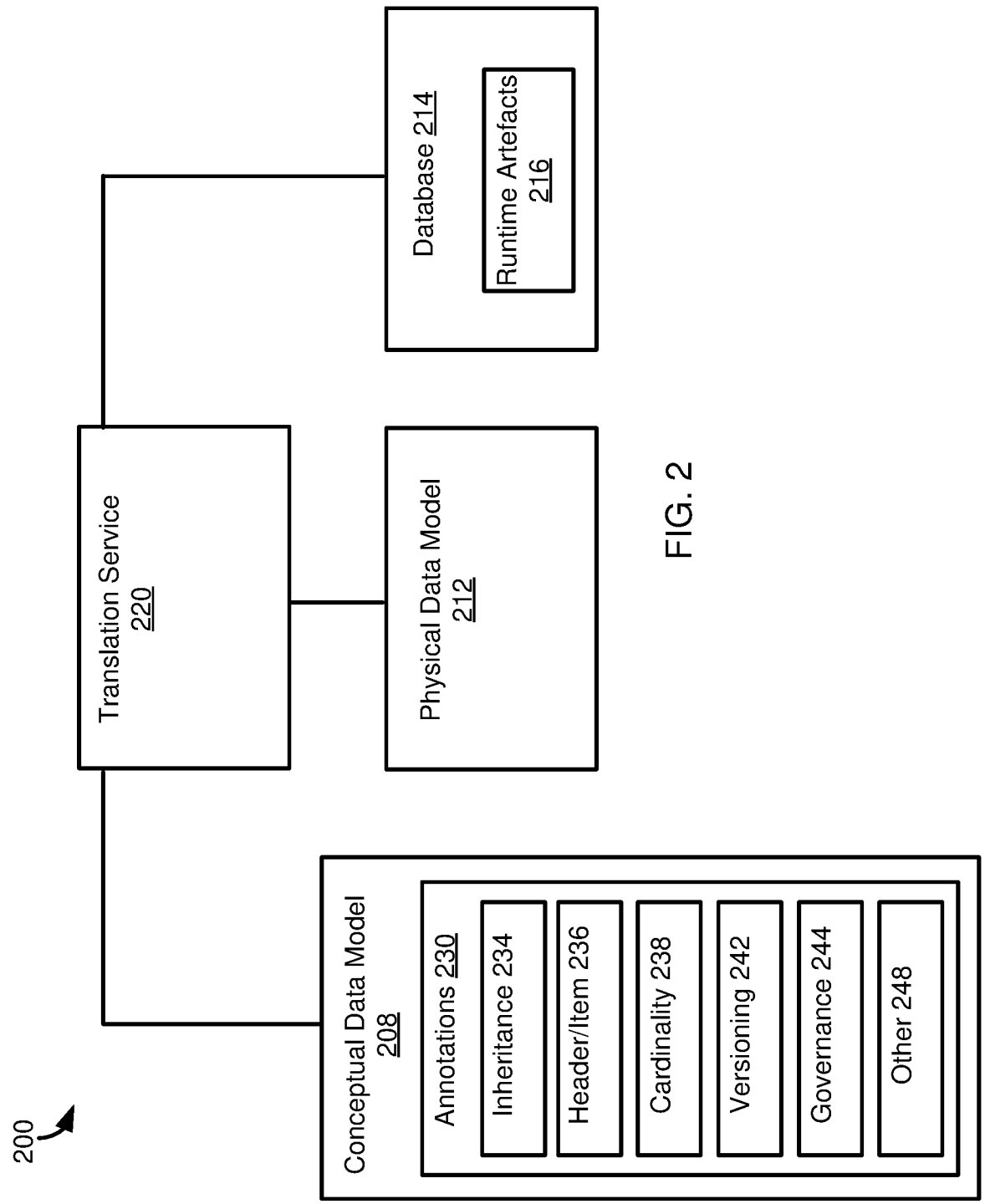
FIG. 2 is a diagram illustrating a process by which a translation service can use annotations of a conceptual data model to produce a physical data model or artefacts in a database system.

FIG. 2 illustrates a process flow 200, depicting how a conceptual data model 208 can be converted to one or both of a physical data model 212 or database artefacts 216 of a database 214 using a translation service 220. The process flow 200 can include components described in connection with the conceptual data model 104, the physical data model 136, or the database artefacts 174 of FIG. 1.

In addition to components shown in the conceptual data model 104 of FIG. 1, the conceptual data model 208 includes annotations 230. The annotations 230 can be of various types, which will be discussed in subsequent portions of the present disclosure, as well as how such annotations are used by the translation service 220. Certain types of annotations 230, inheritance annotations 234, header/item annotations 236, and cardinality annotations 238, contain information about internal relationships 120 of FIG. 1 that can be processed by the translation service 220 to produce components, such as the entities 140, 166 of FIG. 1, of the physical data model 212. In addition, or alternatively, the annotations 234, 236, 238 can be used to produce components of the database 214, such as one or more types of artefacts 174 illustrated in FIG. 1.

As discussed in Example 1, some differences between a conceptual data model and a physical data model, or between a conceptual data model and database artefacts, can be based on requirements or options for implementing database artefacts. These requirements and options can be based at least in part on how entity type names and relationships should be expressed in a physical data model/database artefacts. Other differences can arise because some technical fields may be added to entities in a physical data model/database artefacts as compared with how the entities are expressed in a conceptual data model. That is, these fields may not be necessary for understanding how entities in a conceptual data model relate, and in fact may complicate such understanding. Technical fields can be provided from versioning annotations 242 or data governance annotations 244. Other types of annotations 248 can be provided for a conceptual data model 208.

Various changes to the process flow 200 can be made. For example, a given conceptual data model 208, or a system that implements the process flow 200, need not support all types of annotations 230 for a conceptual data model 208. In addition, some annotations 230 may be provided by the translation service 220 or another component, rather than being made directly to the conceptual data model 208. In particular, a translation service 220 can be configured to add versioning annotations 242, data governance annotations 244, or other types of annotations 248 for any (or selected) conceptual data model 208 to be processed for implementation in the database 214.

Note that the process flow 200 can include additional conversion steps. For example, some conversion steps can be performed without the assistance of the annotations 230. At least some entity types in a conceptual data model can be converted to entity types/tables in a physical data model. Attributes of the entity types in the conceptual data model can be converted to attributes/columns in the corresponding entity type/table of the physical data model.

When evaluating whether an entity type should be created in a physical data model from an entity type in a conceptual data model, various rules can be applied. For example, if two entity types have N-N cardinality, corresponding entity types can be created in the physical data model for both entity types of the conceptual data model. For entity types having a 1-N cardinality or N-1 cardinality, the N-side entity type can be created in the physical data model, but injecting keys from the 1-side entity type. For entity types having 1-1 cardinality, one of the entity types is selected for creation in the physical data model, and keys from the other entity type of the conceptual data model are injected into such entity type of the physical data model.

Example 4—Example Annotations for Inheritance Relationships

Figure 3:
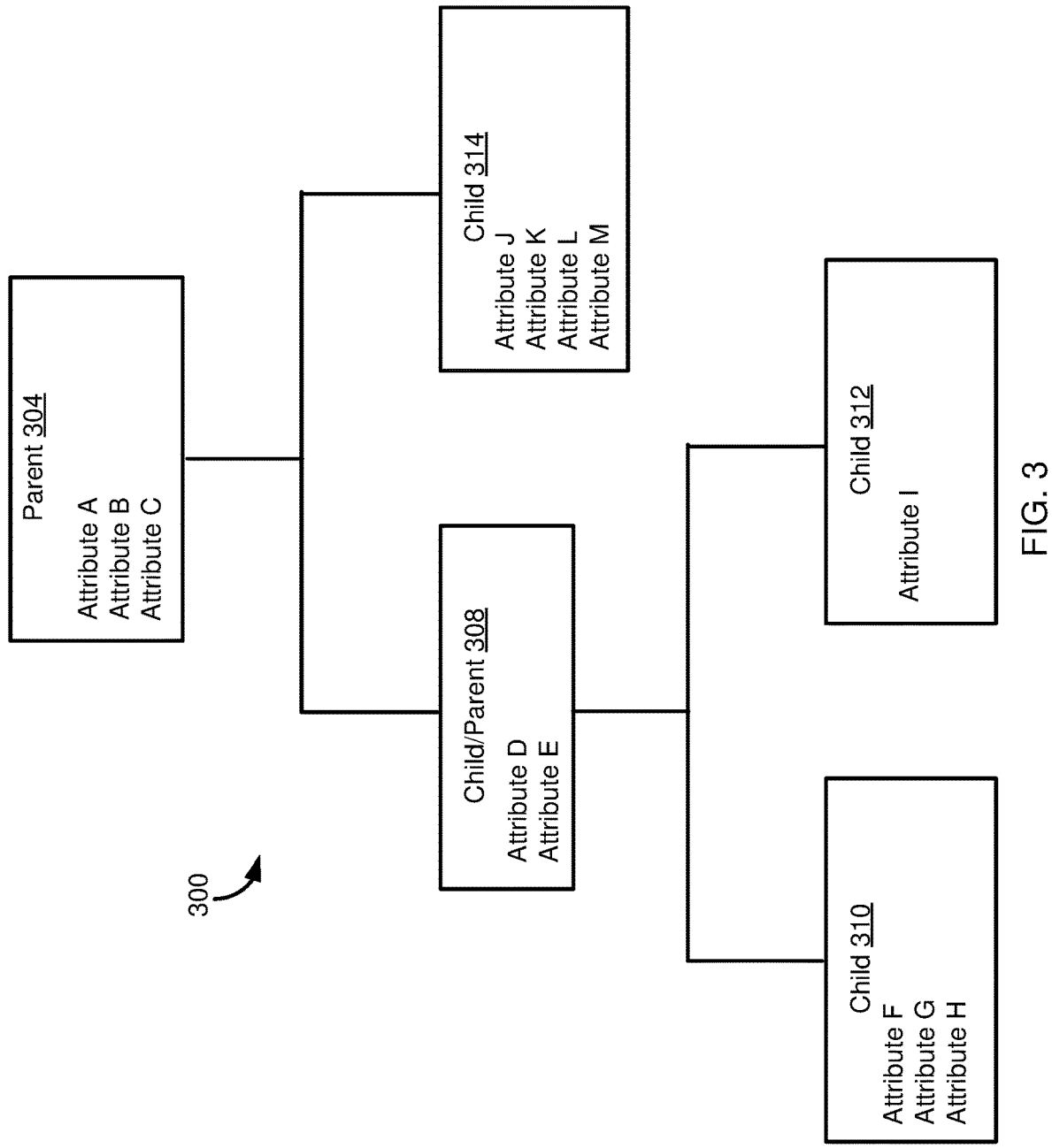
FIG. 3 is a diagram illustrating a graph of entity types and their inheritance relationships.

FIG. 3 illustrates how entities in a conceptual data model can have an inheritance relationship. Relationships between entities can be represented in a tree structure 300. The tree structure 300 includes a root entity type 304, which serves as the ultimate parent entity type for one or more child entities, shown as a plurality of entities 308, 310, 312, 314.

Each child entity type includes the attributes of its parent entity type (or entities, including from indirect parents), as well as any attributes specified for the child entity type. For example, child entity type 308 includes attributes A, B, C as a result of it being a child of entity type 304. Child entity type 308 also includes attributes D and E, as included in the definition of that child entity type.

Child entity type 308 also serves as a parent entity type for child entities 310 and 312. Child entities 310, 312 include the attributes of their direct parent, entity type 308, as well as their indirect parent, root entity type 304. Child entities 310, 312 include any additional attributes defined for those child entities. For example, child entity type 310 includes attributes F, G, H, defined specifically for that child entity type, attributes D, E from entity type 308, and attributes A, B, C from the root entity type 304. In a similar manner, child entity type 314 includes the attributes from the root entity type 304, as well as attributes J, K, L, M defined for that child entity type.

Relationships between parent and child entities in the tree structure 300 can represent a type of internal relationship, as discussed in Example 2. As also discussed in Example 2, typically internal relationships are removed when a conceptual data model is converted to a physical data model, or to database artefacts. In particular, two or more entities of the conceptual data model may be combined into a single entity type (or table definition) in the physical data model, or into a single table in a database.

The present disclosure annotates entities in a conceptual data model with information indicating whether a parent entity type or a child entity type should be generated. A generated child annotation indicates that the parent entity type should not be generated in the physical data model (or as a database artefact). Rather, typically the child of the parent entity type will be generated in the physical data model, or instantiated as a database artefact. When an entity type is annotated with "generate child," attributes from that entity type are added to a child entity type that inherits from the parent entity type.

Similarly, a child entity type can be annotated to indicate that a parent entity type should be generated. More specifically, the "generate parent" annotation, as with the "generate child" annotation, can be applied to a particular edge (relationship) between two entity types. If an entity type (or relationship) is annotated with "generate parent," the child entity type is not created in the physical data model (or as a database artefact). Rather, attributes from the child entity type are included in the entity type created in the physical data model (or instantiated database artefact) for the parent entity type. Note that this process can create entities/tables where not all records having the format of the physical data model entity type or instantiated artefact need have values for all attributes.

Figure 4:
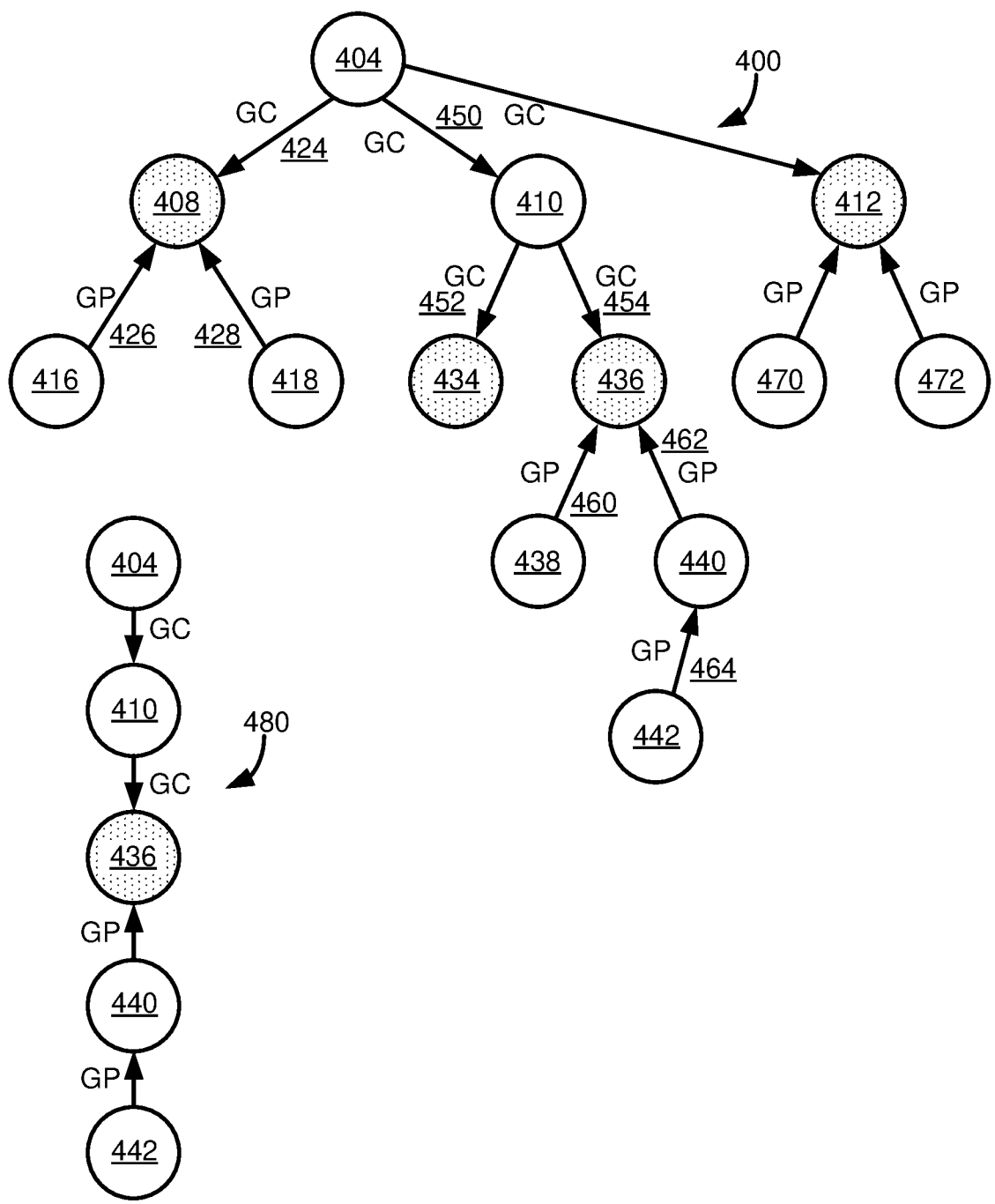
FIG. 4 is a diagram illustrating how entity types, or relationships between entity types, can be annotated with inheritance information that can be used in generating a physical data model or database artefacts.

Indications as to whether a parent or child entity type should be generated can be accomplished in alternative manners. For example, rather than annotating a parent or child entity type, a relationship between entity types can be annotated. FIG. 4, as will be further discussed, provides a tree structure with nodes (or vertices) and edges that connect nodes. In the tree structure, nodes represent entity types, and edges represent relationships between entity types. The above discussion contemplates annotating nodes to indicate whether a parent or child should be generated. However, in other cases an edge between two nodes can be annotated to indicate which node should be generated (and, can reflect whether that is a "generate parent" or "generate child" annotation.

FIG. 4 depicts a tree structure 400 that illustrates relationships between entity types, represented as nodes in a tree, and how the relationships can be annotated to indicate how entity types should be consolidated when a conceptual data model is converted to a physical data model or database artefacts. The tree structure includes thirteen nodes, with node 404 as the root node. Node 404 has three child nodes, nodes 408, 410, 412. Node 408 in turn has child nodes 416, 418. An edge 424 between nodes 404 and 408 indicates that the child node of node 404, node 408, should be generated. Edges 426, 428, between nodes 408 and 416 and 408 and 418, respectively, indicate that the parent node of nodes 416, 418, node 408, should be generated.

Nodes that are pointed to from both parent and child relationships can be created in the physical data model, or instantiated as database artefacts. For example, node 408 is pointed to from its parent 404, as well as from both of its children, nodes 416, 418. Thus, node 408 would be created in a physical data model/as an artefact, but nodes 404, 416, 418 would not.

Node 410 has child nodes 434, 436. Node 434 has no child nodes, while node 436 has child nodes 438, 440. Node 438 has no child node, while node 440 has a single child node 442.

An edge 450 between node 404 and node 410 points to node 410, indicating that node 404 should not be preserved upon conversion. However, edges 452, 454 between nodes 410, 434 and 410, 436 do not point to node 410, but rather to the child nodes. So, while child node 408 is preserved upon conversion, node 410 is not.

As edge 452 points to node 434, and node 434 has no children, node 434 is preserved upon conversion. For node 436, edges 460, 462 between node 436 and its children 438, 440, point to node 436. Since node 436 is pointed to both by its parent 410 and its children 438, 440, node 436 is preserved upon conversion, but nodes 410, 438, 440 are not. Edge 464 between node 442 and 440 points to node 440 which, as discussed, has edge 462 pointing to node 436. Accordingly, node 442 is not preserved upon conversion, and the path from node 442 to node 436, through node 440, is consistent with node 436 being preserved upon conversion.

The relationship between nodes 412 and its child nodes 470, 472 is analyzed in a manner analogous to node 408.

Various rules can be defined to help ensure that a given series of relationships is consistent. For example, for a given path between the root node 404 and a leaf node, a single node should result in an entity type in the physical data model/database artefact. The path between the generated node and the root node, including any intermediate nodes, should have edges that point to the child node. The path between the leaf node and the generated node, including any intermediate nodes, should have edges that point to the parent node. Path 480 is taken from the tree 400, provides the path between the root node 404 and the leaf node 442, and illustrates how these rules can be applied both to determine which node should be generated (node 436) and that the result is correct.

Figure 5:
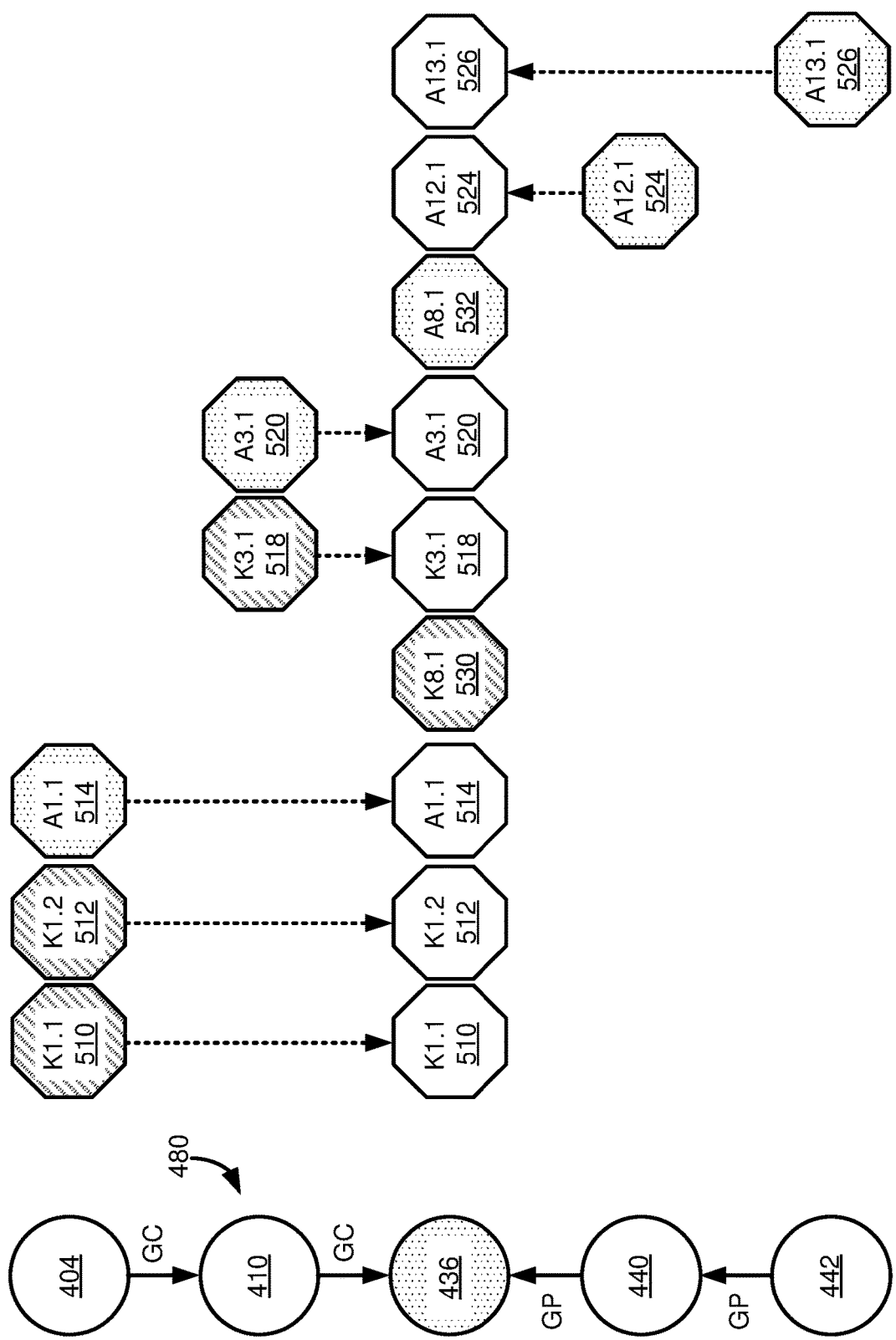
FIG. 5 illustrates how attributes from entity types having an inheritance relationship with a given entity type can be included in an entity type in a physical data model that corresponds to the given entity type.

FIG. 5 illustrates how paths of the tree structure 400 can be used to generate entities in a physical data model, or appropriate database artefacts. In particular, FIG. 5 illustrates the path 480. FIG. 5 also lists the attributes associated with the nodes in the path 480, including indicating which attributes serve as primary keys for the node (e.g., the entity type of a conceptual data model being represented as a node).

Node 404 includes attributes 510, 512, which serve as the primary key for the entity type associated with the node, as well as attribute 514. Node 410 includes an attribute 518 that serves as a primary key, and an additional attribute 520. Nodes 440 and 442 each include a single attribute, attributes 524, 526, respectively.

Node 436 is shown with attribute 530, which serves as a primary key, and attribute 532, which are part of the entity type represented by the node in the conceptual data model. When the path 480 is used to generate an entity type in a physical data model or a database artefact, the generated entity type will include the attributes associated with node 436 in the conceptual data model and the attributes of the parent and child nodes of node 436. So, as shown, node 436 includes attributes 510, 512, 514, 518, 520, 524, 526, 530, 532. Inheritance from nodes higher in the path 480 (e.g., closer to the root node 404) can be referred to as top-down inheritance, while inheritance from nodes lower in the path can be referred to as bottom-up inheritance.

Figure 6:
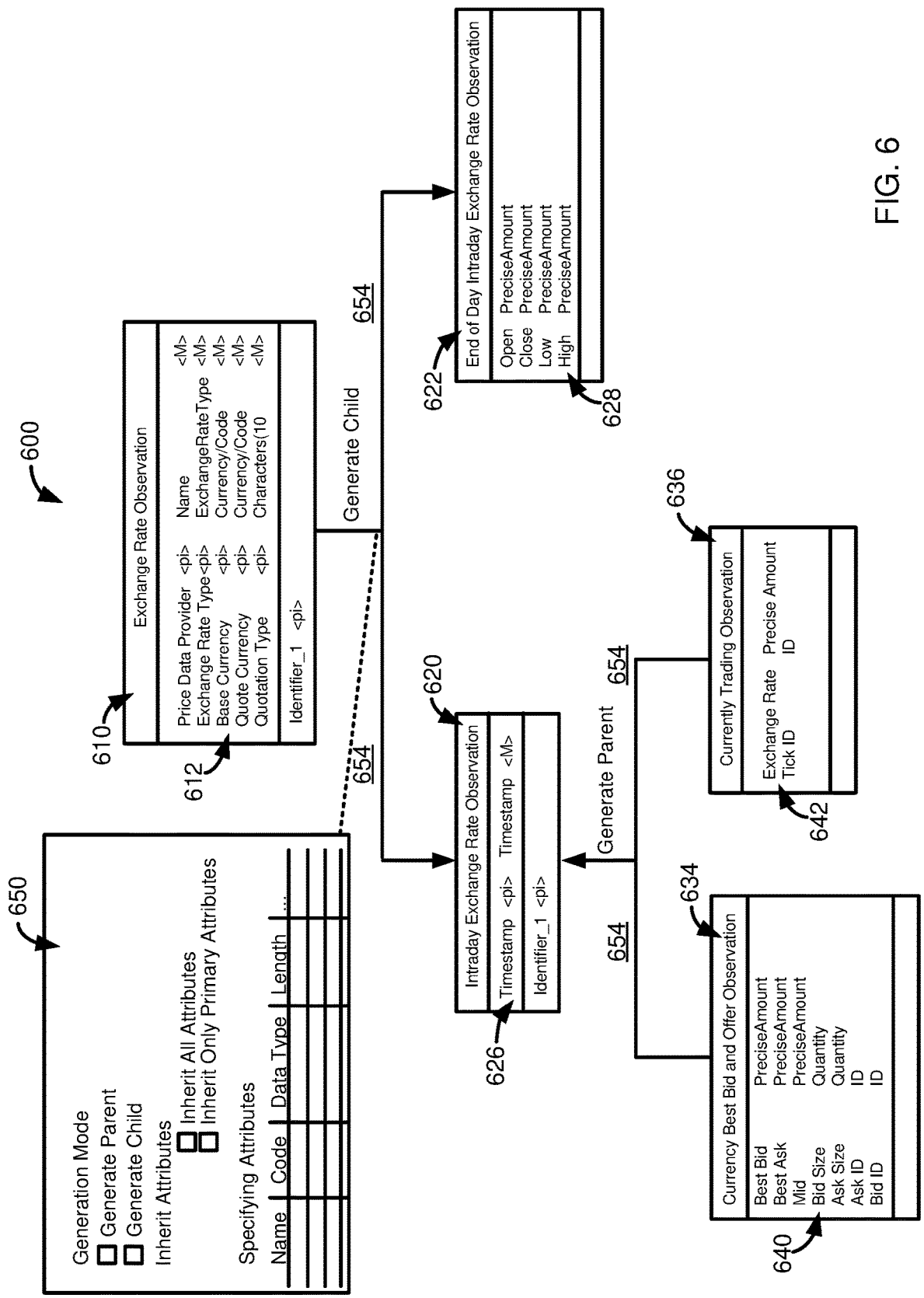
FIG. 6 provides example entity types in a conceptual data model having inheritance relationships and annotations that can be used to produce a physical data model or database artefacts.

FIG. 6 illustrates an entity relationship diagram 600 for a plurality of entities in an example conceptual data model. Entity type 610 provides a plurality of attributes 612 for an exchange rate observation. The entity type 610 can be a genus, where various types, or species, of exchange rate observations may be provided. However, each of these types can have a common set of attributes, the attributes 612, which is why it can be useful to define the entity type 610. Providing information regarding specific exchange rate observation types in separate entities can help users understand attributes that are common to all observation entities, as well as understand specific differences for particular observation types.

As shown in FIG. 6, the entity type 610 has two direct children, entities 620, 622. Entity type 620 represents an intraday exchange rate observation, while entity type 622 represents an end of day exchange rate observation. Note that the attributes 626 of entity type 620 relate individual observations within a given day, so that multiple records for a given day may exist. In order to distinguish these observations from one another, the attributes 626 include a timestamp, indicating when the observation was made, and an identifier than can be used to distinguish between different intraday exchange rate entities.

While the attributes 626 can be important for the entity type 620, they may not be relevant to the end of date observation of the entity type 622, and so are not included in attributes 628 of entity type 622. However, the open, close, low, and high attributes 628 similar are not relevant to the intraday exchange rate observation entity type 620. However, again, attributes such as exchange rate type, base current, and quote currency of the attributes 612 of the entity type 610 are relevant to both entities 620, 622.

FIG. 6 also illustrates how inheritance can have multiple levels, as entity type 620 includes two child entities 634, 636. Entity type 634 provides attributes 640 for a best bid and offer observation that occurs during a day. Entity type 636 provides attributes 642 for a currency trading observation. Again, the attributes 626 of entity type 620 (as well as the attributes 612 of the entity type 610) are relevant for both entities 634, 636, but a given set of attributes 640, 642 is not relevant to the other entity type.

FIG. 6 illustrates entities, or relationships between entities, can be annotated. For example, using an interface 650 (e.g., a portion of a GUI) a user can indicate that one or more relationships 654 to other entities (entities 620, 622 as shown) should generate the parent entity type (entity type 610) or the child entities (entities 620, 622). In other cases, the interface 650 can be used to indicate whether an annotated entity type should be preserved and generated in the physical data model, and relationships with other nodes an be configured accordingly. Or, an entity type can be annotated as not to be preserved in a physical data model, in which case relationships with other nodes can be configured so that another node in a given path is generated in the physical data model. In yet other cases, an entity type can be designated with flexible inheritance properties, such that its relationships can be configured to accomplish other goals, including to satisfy requirements of other entities to be preserved, or not, in a physical data model.

As discussed, a transformation process that uses annotations, including those provided using the interface 650 can be checked for consistency/compliance with various rules. For example, an error can be generated if it is determined that annotations for two directly related entities conflict, such as having one entity type annotation indicating that a child should be generated, with the child having an annotation indicating that the parent should be generated. Another rule can be that any given path should include a single generated node. Particular rules can be configured for particular scenarios, such as particular types of relationships. For example, a process that reads annotations for a conceptual data model related to inheritance might include the "only one generated node per path rule," while another type of process/relationship might not be subject to that rule.

In addition to configuring relationships with other entities with a directionality (e.g., to generate a parent entity type or a child entity type, an entity type can be annotated, including using the interface 650, to indicate whether all attributes from a given entity type should be included in a generated node, or whether only particular types, or specific, attributes should be included). In particular, selection controls can be provided to indicate whether all attributes should be included or only those which serve as primary keys for that entity type.

Figure 7:
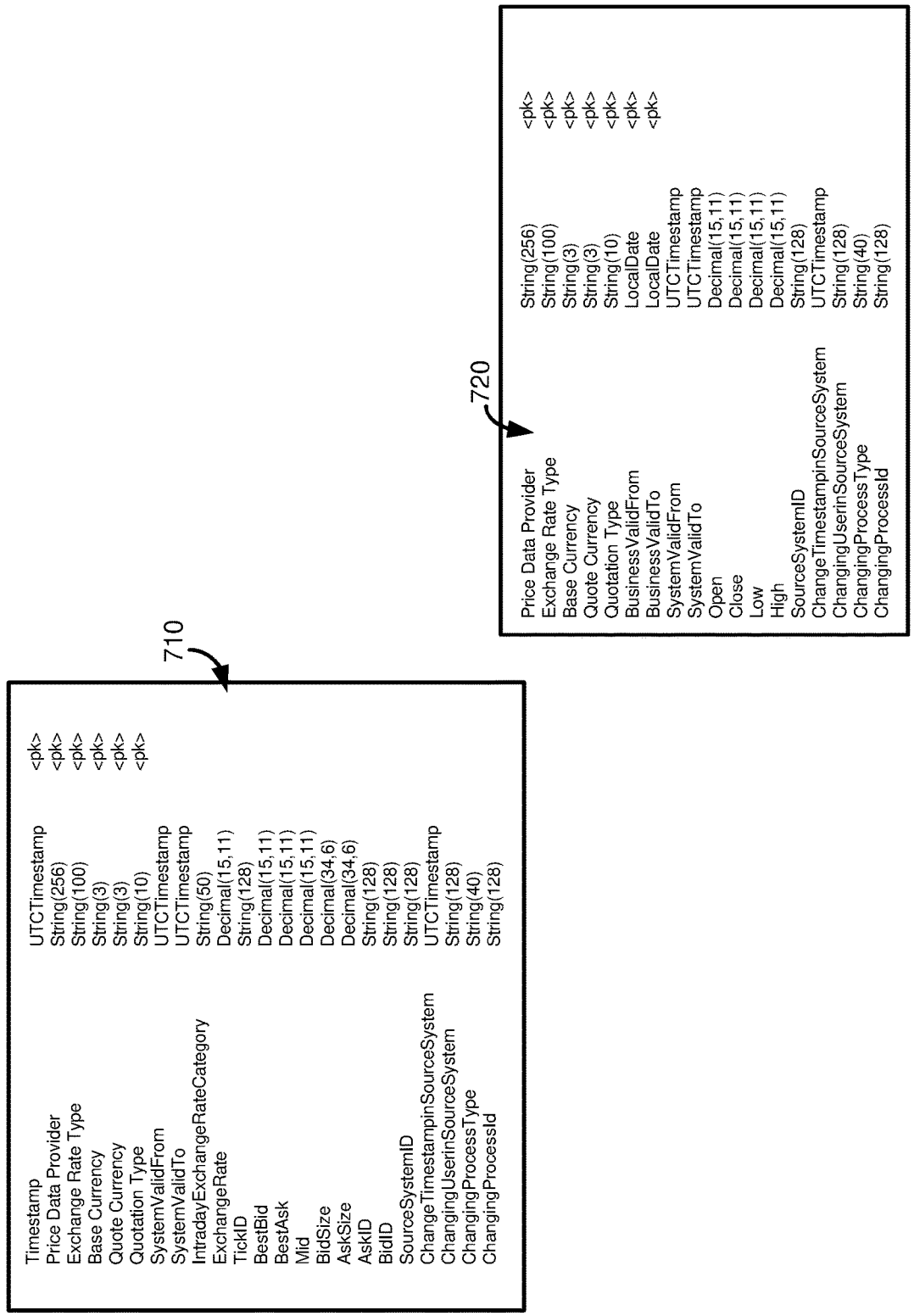
FIG. 7 illustrates example entity types that can be generated from the entity types in FIG. 6 using the annotations.

FIG. 7 illustrates entities 710, 720 in a physical data model that correspond to the entities 620, 622 of FIG. 6 after a translation process has been executed that operates using annotations for the entities of FIG. 6. Entity type 710 corresponds to entity type 620 of FIG. 6, but also includes the attributes 640 of entity type 634, the attributes 642 of entity type 636, and the attributes 612 of entity type 610. Entity type 720 corresponds to the entity type 622 of FIG. 6, and includes the attributes 612 of entity type 614. Note that disclosed transformation can thus result in the attributes of a given entity type, such as the attributes 612 of entity type 610, being duplicated in multiple entity types in a physical data model.

An algorithm for analyzing a group of related entity types can involve traversing each path from a leaf node to a root node and determining which node should be generated (and optionally determining whether no or multiple nodes are generated, which can raise an error, at least in some implementations). For the generated node, all keys and attributes of ancestor (top down) or descendent (bottom up) nodes are added to the generated node. Or, in some cases, only a specified subset of such attributes is added. The generated node, including attributes added from ancestors/descendants, is produced in the physical data model (or as an instantiated database artefact).

Example 5—Example Annotations for Header/Item Entity Types

Figure 8:
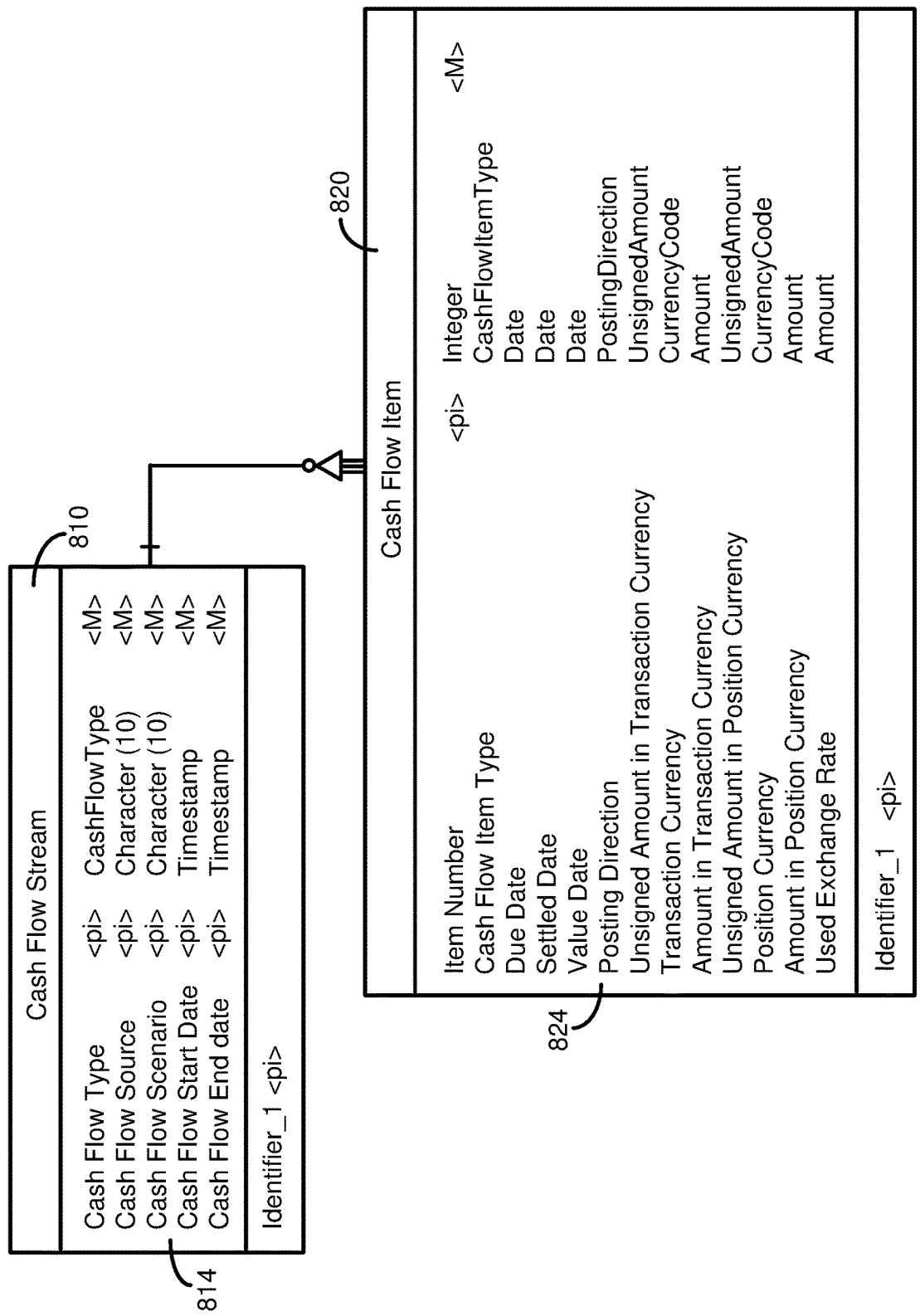
FIG. 8 is a diagram illustrating how entity types can have a header/item relationship.

As discussed in Example 1, entity types in a conceptual data model can have a header/item relationship, which in some ways is similar to the previously discussed inheritance relationship. As a concrete example, FIG. 8 illustrates a header entity type 810 for a cash flow stream. The header entity type 810 includes a plurality of attributes 814, which will eventually be part of a database table (e.g., representing particular fields/columns of a database table corresponding to the header entity type).

FIG. 8 illustrates an item entity type 820 that has a plurality of attributes 824. The attributes 824 will be part of an entity type in a physical data mode/database artefact, as with the attributes 814 of the header entity type 810. An entity (which can correspond to a record of a table corresponding to the entity type 810) of the entity type 810 can serve to bundle a plurality of entities for the item entity type 820. Thus, multiple entities of the item entity type 820 can be associated with a single entity of the header entity type 810, having a common set of values for the attributes 814.

Conceptually separating header attributes 814 from item attributes 824 can help in understanding relationships between data, allowing a user to focus on common features, in the attributes 814, and different features, in the attributes 824. For example, in defining the entity types 810, 820, a user may identify which features are expected to be common for a set of entities. Those features that are common can be included in the header entity type 810 as attributes 814. Attributes that are expected to differ even between entities having a number of attributes in common can be added to the entity type 820 as the attributes 824.

FIG. 8 illustrates a relatively simple scenario, where a single header entity type 810 has a single item entity type 820. In practice, much more complicated relationships are possible. For example, an item entity type may serve as a header entity type for one or more other item entity types. While a given item entity type may have entities that are associated with a single entity of a given header entity type, entities may be associated with multiple header entity types. As will be further explain, disclosed technologies annotate entity types in a manner that allows them to be automatically processed to create a physical data model/database artefacts.

FIG. 9 provides a schematic representation of relationships between entity types, where a given entity type can serve as one or both of a header entity type or an item entity type. The entity types and the relationships can be represented as a data structure, such as a graph 900 (which, depending on the relationships, can be a tree or a heap).

From FIG. 9, it can be seen that some entity types can serve has header entity types for multiple item entity types. In particular, entity type 910 serves as a header entity type for item entity types 912, 914, 916, 918. An item entity type, such as entity type 914, can serve as a header entity type for another item entity type, entity type 928, as shown. Entity type 910 illustrates that a header entity type may take attributes from another header entity type, entity type 932 as shown.

In some embodiments, all related entity types, such as the entity types in the graph 900, are denormalized. In other cases, individual relationships between entity types can be annotated to indicate the connected entities should be denormalized in producing a physical data model or database artefacts.

If, for example, a relationship 960 between entity types 914 and 928 were flagged for denormalization, and a relationship 964 between entity types 914 and 910 were flagged for denormalization, an entity type in the physical data model includes attributes from entities 910, 914, 928. In some cases, entity type 910 can be determined as a root or primary entity type, and is reproduced in the physical data model. In other case, a different entity type can be annotated as the entity type to be generated in the physical data model (e.g., entity type 914 can be annotated for generation and can include the attributes from entity types 910, 928).

In yet further cases, rather than annotating individual relationships, an entity type can be annotated as being denormalized with all related entity types or with entity types having certain properties (e.g., entities marked as header items or being higher, closer to a root entity type, in a hierarchical relationship).

FIG. 10 provides example pseudocode 1000 for a process that can be used to denormalize entity types. The pseudocode includes an addAllAttributes function. This function moves fields from an item entity type to a header entity type. For example, key fields from the item entity type are included as key fields in the header entity type. Foreign key constraints from the item entity type are included as foreign key constrains in the header entity type. Fields that are mandatory in the item entity type are also mandatory in the denormalized table in the physical data model for the header entity type.

The pseudocode 1000 also includes an addAllReltionships function. This function disconnects relationships of an item entity type being merged into a header entity type and connects those relationships to the header entity type, including any self-references from the item entity type to itself.

A preserveHeaderJoinConditions function in the pseudocode 1000 updates any entity types in the physical data model (or to be included in the physical data model) that referenced the header entity type (and not an item entity type being merged into the header entity type) to use the original primary keys for the header entity type (i.e., as defined in the conceptual data model). That is, even if the header item entity type receives additional primary keys from an item entity type, entity types that reference the header are not updated to use those additional primary keys. Referring back to FIG. 8, a denormalized entity type produced from the header entity type 810 and the item entity type 820 would include the primary key, Item Number, from the item entity type. However, entity types that reference the header entity type 810 would not be updated to use the Item Number attribute.

It should be noted that the pseudocode 1000 is implemented in a top-down manner. However, other implementations, including a bottom-up implementation, are within the scope of the present disclosure.

Example 6—Example Annotations for Entity Types Having 1-1 Cardinality Relationship As explained in Example 1, some entity types in a conceptual data model can have a one-to-one cardinality relationship. That is, for first and second related entity types, an entity (or record) of the first entity type is associated with a single entity of the second entity type, and an entity of the second entity type is associated with a single entity of the first entity type. A single set of primary key values (e.g., for the first entity type) can thus be used to identify a unique entity in all entity types having a one-to-one cardinality relationship.

Disclosed technologies provide for processing entity types having a one-to-one cardinality relationship in a conceptual data model in producing a physical data model, or database artefacts. In particular, the relevant entity types can be marked as being in a one-to-one cardinality relationship, and one of any given pair of entity types can be labelled as the dominant entity type. During processing, subordinate entity types can be merged into the dominant entity type to produce a denormalized entity type in the physical data model.

Figures 11, 12:
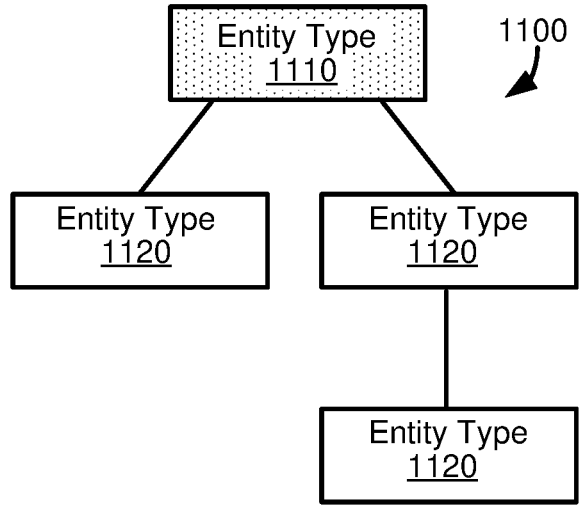
FIG. 11 illustrates how two or more entity types may have a one-to-one cardinality relationship.
FIG. 12 is example pseudocode for processing entity types having a one-to-one cardinality relationship.

FIG. 11 illustrates a graph 1100 formed from a plurality of entity types having a one-to-one cardinality. In a particular embodiment, an entity type in the graph 1100, such as the entity type 1110, is marked as dominant. In some cases, the other entity types, entity types 1120, can be marked as subordinate. However, in another implementation, entity types not marked as dominant are assumed to be subordinate.

In a translation process to produce a physical data model from a conceptual data model, the subordinate entity types 1120 are merged into an entity type that corresponds to the dominant entity type 1110. However, key injection is not needed, because, as explained above, a single set of primary key values for the dominant entity type 1110 was already sufficient to identify unique entities in the subordinate entity types 1120.

FIG. 12 presents pseudocode 1200 for a process for translating entity types having one-to-one cardinalities in a conceptual data model to a single entity type in a physical data model. The pseudocode 1200 is generally similar to the pseudocode 1000 provided for processing header/item entity types. An addAllAttributes function adds attributes from one or more subordinate entity types to the dominant entity type.

An addAllRelationships function adds relationships from the subordinate entity types, including self-references of a subordinate entity type, to the dominant entity type.

Example 7—Example Attribute Sorting

When conceptual data models or physical data models change, including physical data models automatically produced from a conceptual data model using a disclosed translation process, it can be difficult to determine what, if any, aspects of the data model have changed compared to a prior version. Entity types in a data model may have attributes listed in an arbitrary order, and thus a given entity type might require thorough analysis to determine whether differences between attributes at various positions in versions of an entity type differ merely in their position or differ because an attribute has been added, removed, or modified in a first version of the entity type compared with a second version of the entity type.

As an example, consider a first version of an entity type with attributes that appear in the order of B, D, E, A, C. Consider a second version of the entity type with attributes that appear in the order of D, C, A, B, E. While the first attribute differs between the entity type versions, the difference is only in the order of attributes, which typically does not substantively affect the entity type. However, because the attributes are in different orders, it requires careful scrutiny to determine that the attributes are the same. While the given example is fairly trivial, it can be seen how the problem can quickly become more serious as the number of attributes increases. The problem can be even more pronounced in the case of physical data models that use denormalized entity types, which can include attributes from multiple entity types of a conceptual data model and thus have substantially more attributes than individual entity types in the conceptual data model.

FIGS. 13A and 13B illustrate how unsorted attributes can make comparison between versions of an entity type difficult, while FIGS. 14A and 14B illustrate how the comparison process can be made easier using attribute sorting. In FIG. 13B, an attribute 1330 has been added to a second version 1320 of an entity type as compared with attributes 1314 of a first version 1310 of the entity type. That is, the second version 1320 includes the attributes 1314, but additionally includes the attribute 1330.

First, as attribute 1330 is located in between prior attributes 1314 in the second version 1320, it may be difficult to recognize that the attribute 1330 was an added attribute, particularly if, regardless of sorting, it is not guaranteed that the attributes 1314 will otherwise appear in the same order in the second version 1320 as in the first version 1310. Thus, in order to determine that attribute 1330 is new in version 1320, it may be necessary to compare attribute 1330 with all the attributes 1314 in the first version. Similarly, it may be necessary to compare each attribute 1314 in the first version 1310 with the attributes 1314 in the second version 1320 to ensure that they are present in the second version.

FIGS. 14A and 14B illustrates the same scenario as FIGS. 13A and 13B, the addition of attribute 1330, but this time with having the attributes 1314 sorted according to a sorting protocol. In this case, simple comparison of two versions 1410, 1420 can allow attribute 1330 to be identified as a new attribute. An attribute in the second version 1420 that is not present at a corresponding position of the first version 1410 can be identified as an added attribute. An attribute that is absent in the second version 1420 as compared with a corresponding position in the first version 1410 can be identified as a deleted attribute. Sorting can also facilitate identifying modified attributes, such as having attributes with the same name, but different data types between versions 1410, 1420, or differences as to whether a given attribute serves as part of a primary or foreign key.

FIG. 15 illustrates pseudocode 1500 for an example process of sorting attributes. Generally, for each entity type in a data model, attributes are ordered by key fields followed by non-key fields. Line 1504 calls a function 1520 for sorting key fields, while line 1508 calls a function 1530 for sorting non-key fields.

Function 1520 sorts key fields by release for primary keys (e.g., oldest primary key attributes can be listed first, or newest primary key attributes can be listed first, depending on implementation) at line 1522. For primary key attributes within the same release, line 1524 sorts such attributes by name (e.g., alphabetical or reverse alphabetical order). Lines 1526 and 1528 perform analogous sorting as lines 1522, 1524, but for foreign primary key attributes (attributes that are foreign keys for another entity type but also serve as a primary key attribute for a given entity type being processed).

Function 1530 includes lines 1532, 1534, which perform similar sorting as in lines 1522, 1524, but for non-primary key attributes that are foreign keys for another entity type. Lines 1536, 1538 perform sorting analogous to that in lines 1522, 1524, but for non-foreign key, non-primary key attributes. Thus, the result of the pseudocode 1500 is entity attributes sorted by groups of primary keys, foreign primary keys, foreign keys, and non-key, where attributes within a given group are first sorted by release and then sorted by name. However, other sorting methodologies are within the scope of the disclosed technologies.

It can thus be seen how disclosed sorting techniques can facilitate manual detection of similarities and differences between data models. However, these sorting techniques can also facilitate automated comparison, such as by making them faster or more accurate by allowing them to operate on sorted results.

Example 8—Example Versioning and Data Governance Annotations

As explained in Example 1, in some cases, an entity type in a physical data model can have additional attributes as compared with the entity type as defined in the physical data model. These additional attributes are often technical attributes—attributes which help with data governance or database operation/administration, but which may not have a special semantic meaning for a particular entity type. Correspondingly, these technical attributes can be added to multiple conceptual entity types/appear in multiple entity types in a physical data model. These added attributes are typically different than attributes added to an entity type in a physical data model as a result of denormalization processes (e.g., inheritance, cardinality, header/item relationships).

As the physical data model is typically automatically produced from a conceptual data model, the conceptual data model can be annotated such that technical attributes, or other types of attributes to be added, can be included in the physical data model. In some cases, a particular entity type, or a group or set of entity types, can be annotated with specific attributes that should be added. Or, an entity type or set of entity types can be annotated with a specific type of attributes that should be added (e.g., "add data governance attributes," "add versioning attributes," where the attributes for a particular attribute type can be separately specified). In a particular implementation, Boolean values for entity types in a conceptual data model can be set to indicate whether particular types of technical attributes should be added during conversion (e.g., BusinessVersioning=FALSE). In some cases, properties, such as a data type (e.g., Date or UTCTimestamp) can be selected for an entity type using annotations to a conceptual data model.

In other embodiments, the translation process itself can be defined to add additional attributes, either for all entity types being processed or for particular sets/classes of entity types. For example, a translation process can be defined to add data governance attributes to all entity types in a physical data model.

Additionally, or alternatively, an entity type, a set of entity types, or a translation process can be configured to create additional entity types as compared with a physical model. For example, in a physical data model, an entity type of a conceptual data model may be represented as a first entity type, having current data, and a second entity type, having historical data. A process to automatically generate any additional entity types can also be configured to add any additional attributes that may be used with the automatically generated entity type (e.g., versioning attributes for a historical entity type). In some cases, some attributes from an entity type of a conceptual data model, such as key fields, can be omitted from an automatically generated entity type.

Versioning attributes, in a specific example, can include "SystemValidFrom" and "SystemValidTo" dates, and/or "BusinessValidFrom" and "BusinessValidTo" dates.

FIG. 16 provides example pseudocode 1600 for an example process of determining whether to add versioning information to an entity type, and for determining whether a historical entity type should be created for a given entity type of a conceptual data model. At line 1610, the pseudocode checks to see if a Boolean variable has been set indicating that data versioning, for business purposes, should apply to a given entity type. If so, lines 1614, 1616 add appropriate attributes to the entity type as represented in the physical data model.

Line 1630 checks a given entity type being processed to determine whether system versioning should apply. If so, lines 1634, 1636 add appropriate attributes to the corresponding entity type in the physical data model. Lines 1640, 1642, 1644 create a historical entity type in the physical data model including removing key attributes from the historical entity type.

Example 9—Example Cloud Environment Providing Data Model Conversion Service

In some cases, disclosed technologies can be performed using the same computing system on which a conceptual data model is stored, and conversion of the conceptual data model is to be performed. In other cases, a conceptual data model conversion service can be provided that can be accessible to one or more other computing systems.

Figure 17:
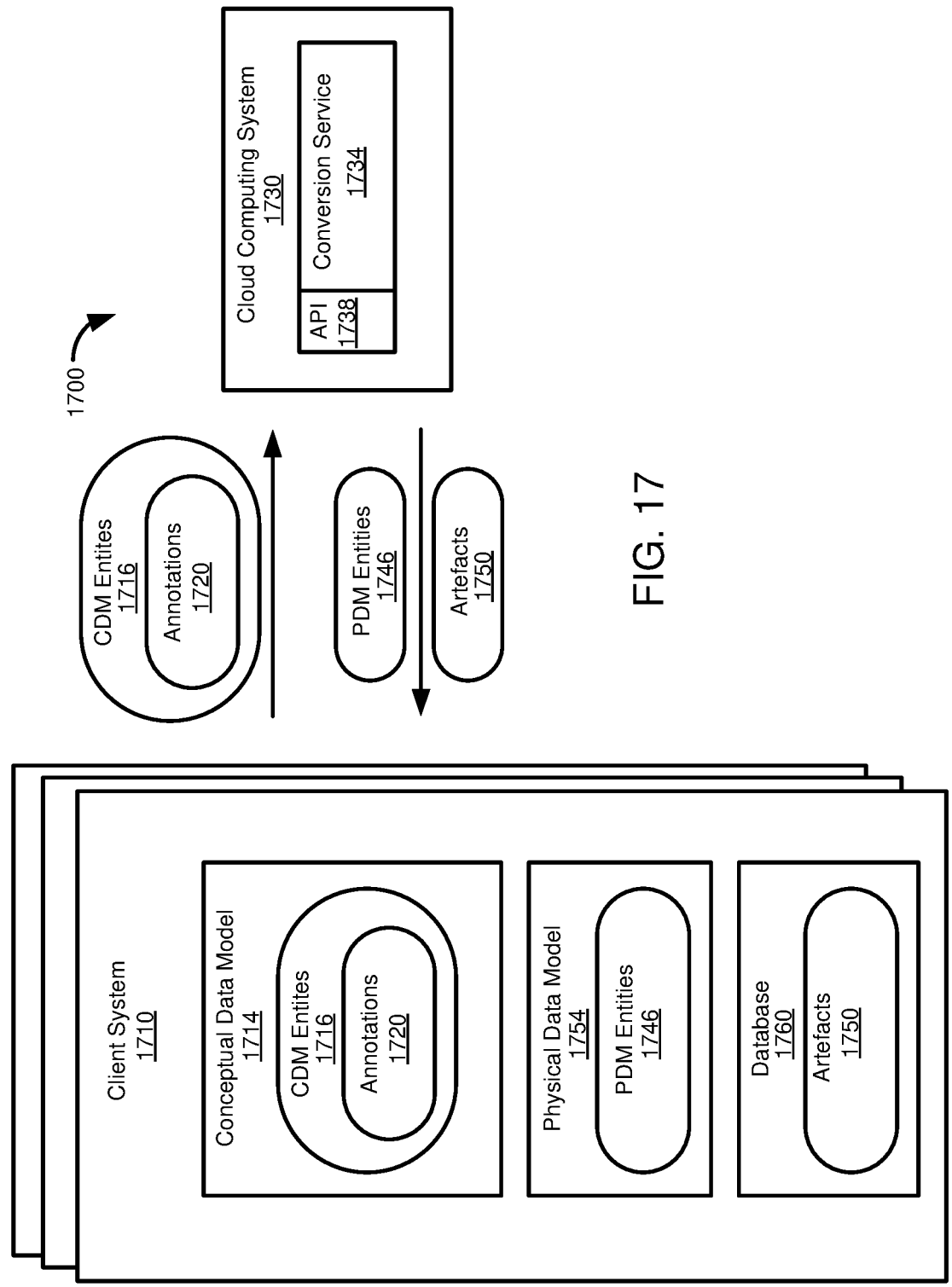
FIG. 17 is a diagram illustrating how data model translation can be provided as a cloud-based service.

For example, FIG. 17 illustrates a computing environment 1700 in which conceptual data model conversion is provided as a cloud-based service. The computing environment 1700 includes one or more client systems 1710. Each of the client systems 1710 includes at least one conceptual data model 1714 that includes one or more entity types 1716, at least a portion of which have annotations 1720 as described in the present disclosure.

The cloud computing environment 1700 also includes a cloud computing system 1730. The cloud computing system 1730 includes a data model conversion service 1734. The client systems 1710 may access the data model conversion service 1724, such as using an API 1738 presented by the data model conversion service. When calling the API 1738, a client system 1710 can provide entity types 1716, and annotations 1720, in the conceptual data model 1714.

In response, the data model conversion service 1734 can return one or both of physical data model entities 1746 or database artefacts 1750. The physical data model entities 1746 can be stored in a physical data model 1754 of the client system 1710, while any database artefacts 1750 can be stored (or instantiated in) a database 1760. In some cases, database artefacts 1750 are provided by the cloud computer system 1730 in the form of code (e.g., DDL statements) to create the database artefacts in the database 1760.

Example 10—Example Data Model Mapping

FIG. 18 provides a table 1800 that demonstrates how entity types of a conceptual data model can be mapped to entity types of a physical data model, where the physical data model was produced using disclosed technologies. Column 1810 lists attributes 1814 and entity types 1818 in the physical data model, with column 1830 indicating whether a given entry (record) of the table 1800 is an attribute or an entity type. For attributes 1814, column 1820 indicates the entity type 1818 with which the attribute is associated.

Columns 1840, 1850, 1860 are similar to columns 1810, 1820, 1830, but provide information regarding attributes 1814 and entity types 1818 in the conceptual data model processed to produce the physical data model.

Table 1800 illustrates how multiple entity types 1818 of a conceptual data model can be merged into a denormalized entity type of a physical data model. For example, the ExchangeRateObservation entity type 1818a in the conceptual data model does not exist in the physical data model. Rather, its attributes 1814a are included in the IntradayExchangeRateObservation and EndOfDayExchangeRateObservation entity types 1818b of the physical data model. Thus, the table 1800 illustrates that the physical data model is produced from the conceptual data model as indicated in FIG. 6, where the entity types 620, 622 are indicated as the generated entity types, and which include the attributes 612 of the parent entity type 610.

FIG. 19 provides a table 1900 illustrating how a physical data model can be specified for mapping to a conceptual data model. A conversion process can use the table 1900 to select a conceptual data model for processing, where the results of the processing are stored in the physical data model specified in a record of the table 1900. Or, the table 1900 can be used to produce a mapping between physical and conceptual data models, where the conversion process is specified/initiated in another manner That is, in some cases the table 1800 can be produced during a conversion process, and the conversion process can be based at least in part on information in the table 1900. In other cases, the table 1800 can be created as part of a mapping process that is separate from the conversion process, where the table 1900 specifies two schemas to be mapped, where the schemas are expected to have been created by a separate conversion process.

The table 1900 includes a column 1910 specifying a particular schema alignment (i.e., a correspondence/mapping to be used between a specified conceptual data model schema and a physical data model schema). Columns 1920, 1930 specify, respectively, a particular physical data model into which result will be stored from processing a specified conceptual data model. Columns 1940, 1950 can be used to specify particular versions for the physical data model and the conceptual data model, respectively.

Example 11—Example Data Transformation Operations

FIG. 20A is a flowchart of a method 2000 for converting a conceptual data model to a physical data model using annotations in the conceptual data model. The method 2000 can include features of the process 200 of FIG. 2, and components of conceptual data models and physical data models shown in FIG. 1.

At 2002, a conceptual data model is received. The conceptual data model includes a plurality of entity types. At least a portion of the entity types are annotated entity types, where an annotated entity type includes one or more annotations for creating a physical data model from the conceptual data model.

The conceptual data model is automatically processed to produce the physical data model. It is determined at 2004 that a first annotated entity type has a relationship with a second annotated entity type. At 2006, it is determined that the first annotated entity type is to be combined with the second annotated entity type in a first entity type of the physical data model. The first entity type is created in the physical data model at 2008. At 2010, for the first entity type, at least a portion of the attributes of the first annotated entity type and at least a portion of attributes of the second entity type are created.

FIG. 20B is a flowchart of a method 2040 for converting a conceptual data model to a physical data model using annotations in the conceptual data model. The method 2040 can include features of the process 200 of FIG. 2, and components of conceptual data models and physical data models shown in FIG. 1.

At 2042, a conceptual data model is received that includes a first entity type having an inheritance relationship with at least a second entity type and at least a third entity type. The first, at least a second, and at least a third entity types are arranged in a graph data structure that includes a root node and at least one leaf node. A path between the root node and the at least one leaf node is determined at 2044. The path includes the first, at least a second, and at least a third entity types.

At 2046, it is determined whether a first annotation between the first entity type and the at least a second entity type is to generate a parent entity type or a child entity type. It is determined at 2048 whether a second annotation between the first entity type and the at least a third entity type is to generate a parent entity type or a child entity type. At 2050, based on annotation types for the first and second annotations, a selected entity type of the first, at least a second, and at least a third entity types is determined for which a corresponding entity type should be generated in a physical data model. Other entity types of the first, at least a second, and at least a third entity types are unselected entity types. In the physical data model, at 2052, at least a portion of attributes of the unselected entity types are included in the corresponding entity type.

Figure 20C:
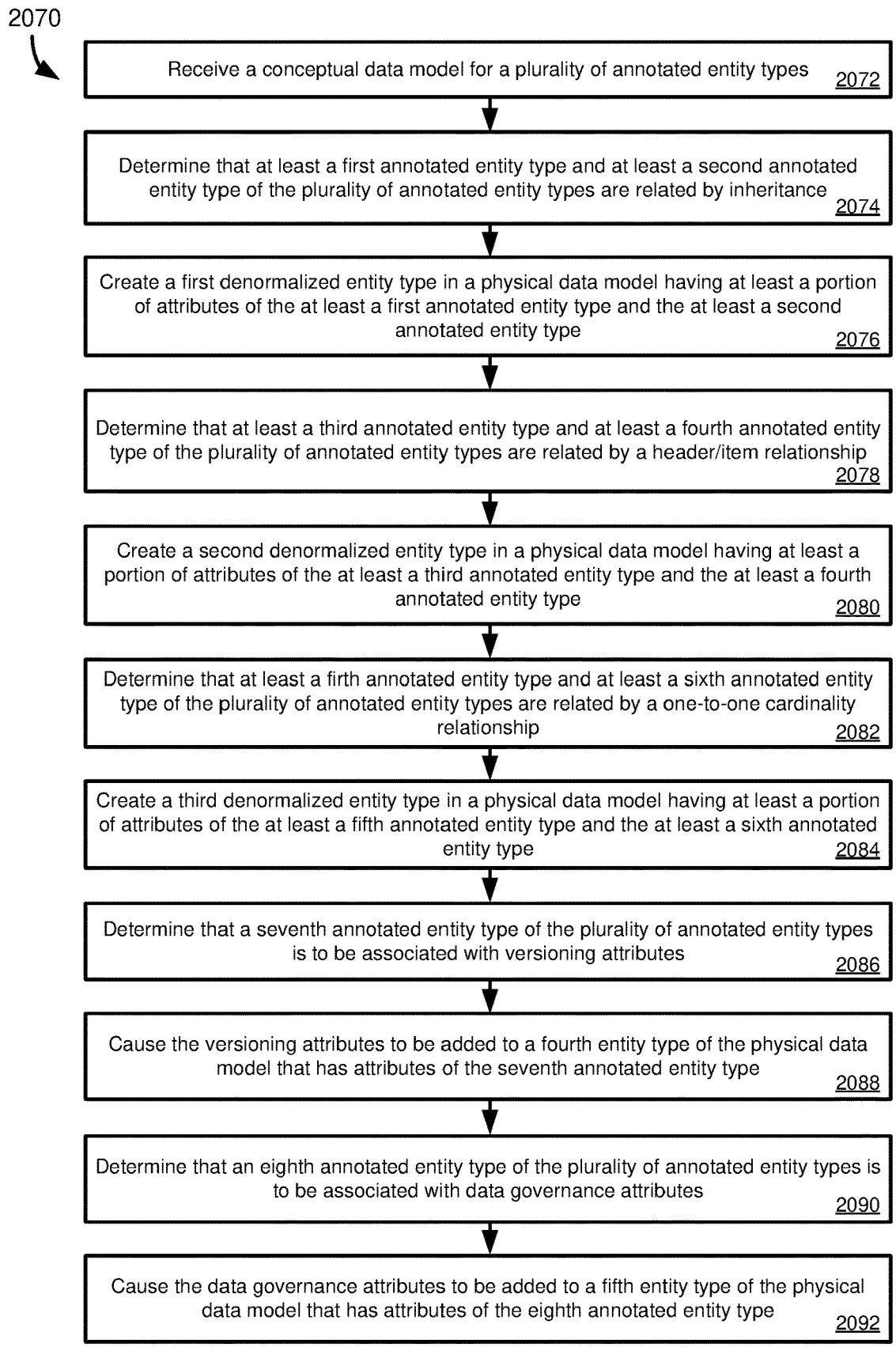

FIG. 20C is a flowchart of a method 2070 for converting a conceptual data model to a physical data model using annotations in the conceptual data model. The method 2070 can include features of the process 200 of FIG. 2, and components of conceptual data models and physical data models shown in FIG. 1.

At 2072, a conceptual data model is received for a plurality of annotated entity types. It is determined at 2074 that at least a first annotated entity type and at least a second annotated entity type are related by inheritance. At 2076, a first denormalized entity type is created in a physical data model, and includes at least a portion of attributes of the at least a first annotated entity types and the at least a second annotated entity type.

It is determined at 2078 that at least a third annotated entity type and at least a fourth annotated entity type are related by a header/item relationship. At 2080, a second denormalized entity type in the physical data model is created that includes at least a portion of attributes of the at least a third annotated entity type and the at least a fourth annotated entity type.

It is determined at 2082 that a fifth annotated entity type and a sixth annotated entity type are related by a one-to-one cardinality relationship. At 2084, a third denormalized entity type in the physical data model is created that includes at least a portion of attributes of the at least a fifth annotated entity type and the at least a sixth annotated entity type.

It is determined at 2086 that a seventh annotated entity type is to be associated with versioning attributes. The versioning attributes are added to a fourth entity type of the physical data model that includes attributes of the seventh annotated entity type at 2088. At 2090, it is determined that an eighth annotated entity type is to be associated with data governance attributes. The data governance attributes are added to a fifth entity type of the physical data model that includes attributes of the eighth annotated entity type at 2092.

Example 12—Computing Systems

Figure 21:
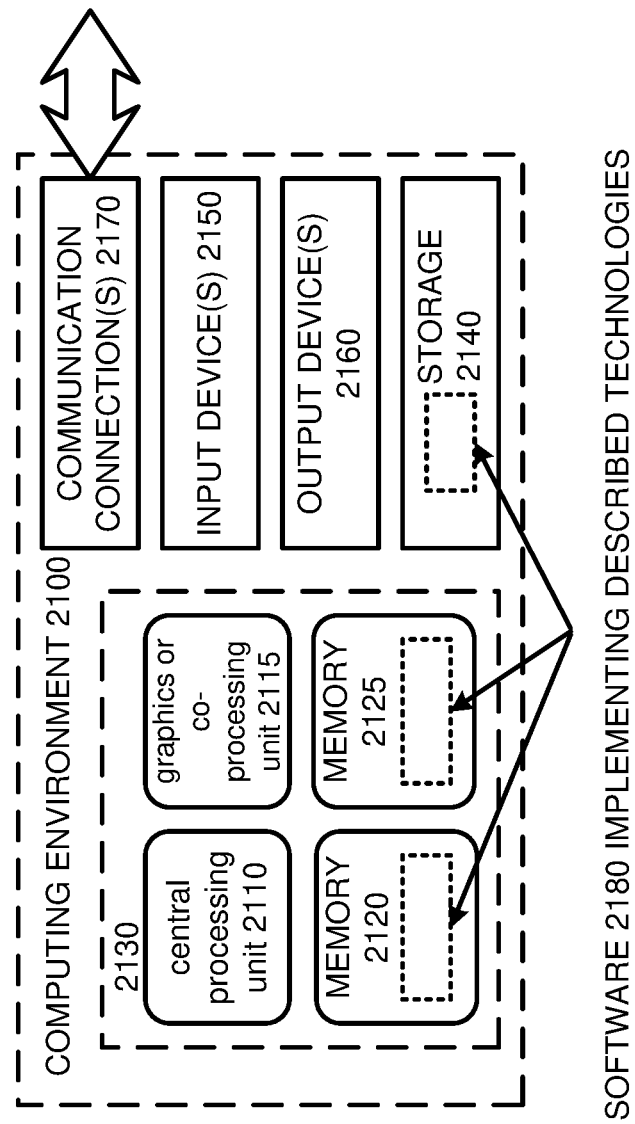
FIG. 21 is a diagram of an example computing system in which some described embodiments can be implemented.

FIG. 21 depicts a generalized example of a suitable computing system 2100 in which the described innovations may be implemented. The computing system 2100 is not intended to suggest any limitation as to scope of use or functionality of the present disclosure, as the innovations may be implemented in diverse general-purpose or special-purpose computing systems.

With reference to FIG. 21, the computing system 2100 includes one or more processing units 2110, 2115 and memory 2120, 2125. In FIG. 21, this basic configuration 2130 is included within a dashed line. The processing units 2110, 2115 execute computer-executable instructions, such as for implementing technologies described in Examples 1-11. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 21 shows a central processing unit 2110 as well as a graphics processing unit or co-processing unit 2115. The tangible memory 2120, 2125 may be volatile memory (e.g., registers, cache, RAM), non-volatile memory (e.g., ROM, EEPROM, flash memory, etc.), or some combination of the two, accessible by the processing unit(s) 2110, 2115. The memory 2120, 2125 stores software 2180 implementing one or more innovations described herein, in the form of computer-executable instructions suitable for execution by the processing unit(s) 2110, 2115.

A computing system 2100 may have additional features. For example, the computing system 2100 includes storage 2140, one or more input devices 2150, one or more output devices 2160, and one or more communication connections 2170. An interconnection mechanism (not shown) such as a bus, controller, or network interconnects the components of the computing system 2100. Typically, operating system software (not shown) provides an operating environment for other software executing in the computing system 2100, and coordinates activities of the components of the computing system 2100.

The tangible storage 2140 may be removable or non-removable, and includes magnetic disks, magnetic tapes or cassettes, CD-ROMs, DVDs, or any other medium which can be used to store information in a non-transitory way, and which can be accessed within the computing system 2100. The storage 2140 stores instructions for the software 2180 implementing one or more innovations described herein.

The input device(s) 2150 may be a touch input device such as a keyboard, mouse, pen, or trackball, a voice input device, a scanning device, or another device that provides input to the computing system 2100. The output device(s) 2160 may be a display, printer, speaker, CD-writer, or another device that provides output from the computing system 2100.

The communication connection(s) 2170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 22:
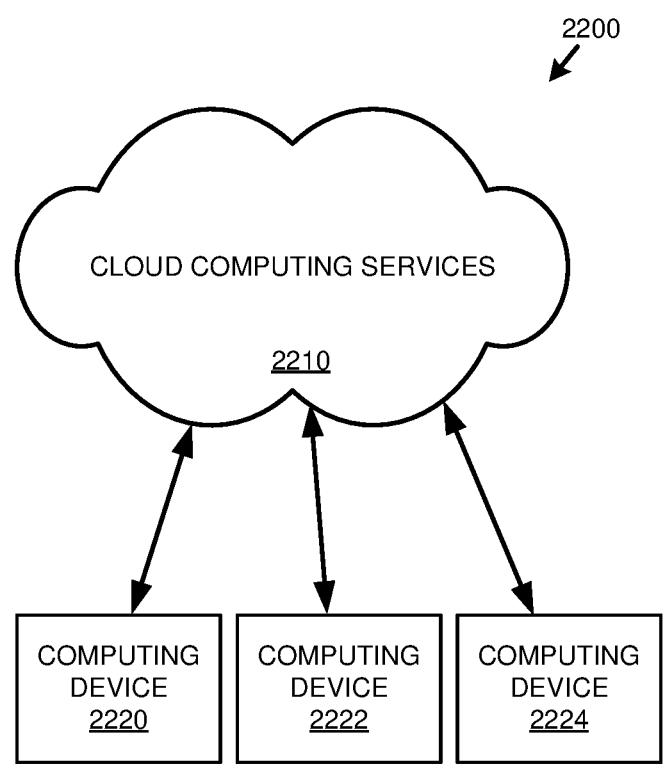
FIG. 22 is an example cloud computing environment that can be used in conjunction with the technologies described herein.

FIG. 22 depicts an example cloud computing environment 2200 in which the described technologies can be implemented. The cloud computing environment 2200 comprises cloud computing services 2210. The cloud computing services 2210 can comprise various types of cloud computing resources, such as computer servers, data storage repositories, networking resources, etc. The cloud computing services 2210 can be centrally located (e.g., provided by a data center of a business or organization) or distributed (e.g., provided by various computing resources located at different locations, such as different data centers and/or located in different cities or countries).

The cloud computing services 2210 are utilized by various types of computing devices (e.g., client computing devices), such as computing devices 2220, 2222, and 2224. For example, the computing devices (e.g., 2220, 2222, and 2224) can be computers (e.g., desktop or laptop computers), mobile devices (e.g., tablet computers or smart phones), or other types of computing devices. For example, the computing devices (e.g., 2220, 2222, and 2224) can utilize the cloud computing services 2210 to perform computing operators (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 21, computer-readable storage media include memory 2120 and 2125, and storage 2140. The term computer-readable storage media does not include signals and carrier waves. In addition, the term computer-readable storage media does not include communication connections (e.g., 2170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
memory;
one or more hardware processing units coupled to the memory; and
one or more computer readable storage media storing instructions that, when executed, cause the computing system to perform operations comprising:
receiving a conceptual data model, the conceptual data model comprising a plurality of entity types, at least a portion of the plurality of entity types being annotated entity types comprising one or more conceptual data model to physical data model conversion annotations;
automatically processing the conceptual data model to produce a physical data model, the automatically processing comprising, for a first annotated entity type of the at least a portion of the plurality of entity types, the first annotated entity type comprising a first set of one or more attributes:
determining that the first annotated entity type has a relationship to a second annotated entity type of the at least a portion of the plurality of entity types, the second annotated entity type comprising a second set of one or more attributes, wherein at least one attribute of the second set of one or more attributes differs from attributes of the first set of one or more attributes;
determining that the first annotated entity type is to be combined with the second annotated entity type in a first entity type of the physical data model;
reading a conceptual data model to physical data model conversion annotation of the one or more conceptual data model to physical data model conversion annotations for the relationship, the conceptual data model to physical data model conversion annotation for the relationship indicating that the second annotated entity type will be generated in the physical data model as the first entity type;
based at least in part on the conceptual data model to physical data model conversion annotation for the relationship, creating the first entity type in the physical data model; and
creating for the first entity type in the physical data model at least a portion of the first set of one or more attributes of the first annotated entity type and at least a portion of the second set of one or more attributes of the second annotated entity type, the at least a portion of the second set of one or more attributes comprising the at least one attribute of the second set of one or more attributes that differs from attributes of the first set of one or more attributes, whereby the first entity type in the physical data model represents a denormalized entity as compared with the first entity type and the second entity type in the conceptual data model.

2. The computing system of claim 1, wherein the relationship is an inheritance relationship.

3. The computing system of claim 1, wherein the first annotated entity type is a parent entity type of the second annotated entity type and the relationship is associated with a conceptual data model to physical data model conversion annotation indicating that the parent entity type should be generated.

4. The computing system of claim 1, wherein the first annotated entity type is a child entity type of the second annotated entity type and the relationship is associated with a conceptual data model to physical data model conversion annotation indicating that the child entity type should be generated.

5. The computing system of claim 1, wherein a first conceptual data model to physical data model conversion annotation of the first annotated entity type identifies the first annotated entity type as an item entity type and a second conceptual data model to physical data model conversion annotation of the second annotated entity type identifies the second annotated entity type as a header entity type.

6. The computing system of claim 5, wherein the first annotated entity type and the second annotated entity type are part of a graph with at least a third annotated entity type, the operations further comprising:
determining that the second annotated entity type forms a root node of the graph.

7. The computing system of claim 1, wherein the relationship is a one-one cardinality relationship.

8. The computing system of claim 7, the operations further comprising:
determining that a conceptual data model to physical data model conversion annotation of the second annotated entity type identifies the second annotated entity type as a dominant entity type in the relationship with the first annotated entity type.

9. The computing system of claim 1, the operations further comprising:
sorting attributes of the first entity type to provide first sorted attributes; and
displaying the first sorted attributes.

10. The computing system of claim 9, wherein the first entity type is a first version of the first entity type, the operations further comprising:
sorting attributes of a second version of the first entity type to provide second sorted attributes; and
displaying the first sorted attributes proximate the second sorted attributes.

11. The computer system of claim 1, the operations further comprising:
determining from a conceptual data model to physical data model conversion annotation of the first annotated entity type that the first entity type is to be associated with one or more versioning attributes; and
adding the one or more versioning attributes to the first entity type.

12. The computing system of claim 11, the operations further comprising:
creating a second entity type in the physical data model, the second entity type being a historical entity type and corresponding to the first entity type.

13. The computing system of claim 12, wherein the second entity type is created based on the conceptual data model to physical data model conversion annotation for the one or more versioning attributes.

14. The computing system of claim 1, the operations further comprising:
determining from a conceptual data model to physical data model conversion annotation of the first annotated entity type that the first entity type is to be associated with one or more data governance attributes; and
adding the one or more data governance attributes to the first entity type.

15. The computing system of claim 1, the operations further comprising:
generating a mapping relating entity types of the conceptual data model to entity types of the physical data model.

16. The computing system of claim 1, the operations further comprising:
generating a database table corresponding to the first entity type, the database table being generated in a column-store database system.

17. A method, implemented in a computing system comprising at least one hardware processor and at least one memory coupled to the at least one hardware processor, the method comprising:
receiving a conceptual data model, the conceptual data model comprising a plurality of entity types, at least a portion of the plurality of entity types being annotated entity types comprising one or more conceptual data model to physical data model conversion annotations;
automatically processing the conceptual data model to produce a physical data model, the automatically processing comprising, for a first annotated entity type of the at least a portion of the plurality of entity types, the first annotated entity type comprising a first set of one or more attributes:
determining that the first annotated entity type has a relationship to a second annotated entity type of the at least a portion of the plurality of entity types, the second annotated entity type comprising a second set of one or more attributes, wherein at least one attribute of the second set of one or more attributes differs from attributes of the first set of one or more attributes;
determining that the first annotated entity type is to be combined with the second annotated entity type in a first entity type of the physical data model;
reading a conceptual data model to physical data model conversion annotation of the one or more conceptual data model to physical data model conversion annotations for the relationship, the conceptual data model to physical data model conversion annotation for the relationship indicating that the second annotated entity type will be generated in the physical data model as the first entity type;
based at least in part on the conceptual data model to physical data model conversion annotation for the relationship, creating the first entity type in the physical data model; and
creating for the first entity type in the physical data model at least a portion of the first set of one or more attributes of the first annotated entity type and at least a portion of the second set of one or more attributes of the second annotated entity type, the at least a portion of the second set of one or more attributes comprising the at least one attribute of the second set of one or more attributes that differs from attributes of the first set of one or more attributes, whereby the first entity type in the physical data model represents a denormalized entity as compared with the first entity type and the second entity type in the conceptual data model.

18. The method of claim 17, wherein (1) the first annotated entity type is a parent entity type of the second annotated entity type and the relationship is associated with a conceptual data model to physical data model conversion annotation indicating that the parent entity type should be generated; or (2) first annotated entity type is a child entity type of the second annotated entity type and the relationship is associated with a conceptual data model to physical data model conversion annotation indicating that the child entity type should be generated.

19. One or more computer-readable storage media comprising:
computer-executable instructions that, when executed by a computing system comprising at least one hardware processor and at least one memory coupled to the at least one hardware processor, cause the computing system to receive a conceptual data model, the conceptual data model comprising a plurality of entity types, at least a portion of the plurality of entity types being annotated entity types comprising one or more conceptual data model to physical data model conversion annotations;

computer-executable instructions that, when executed by the computing system, cause the computing system to automatically process the conceptual data model to produce a physical data model, the automatically processing comprising, for a first annotated entity type of the at least a portion of the plurality of entity types, the first annotated entity type comprising a first set of one or more attributes, computer-executable instructions that, when executed by the computing system, cause the computing system to:

determine that the first annotated entity type has a relationship to a second annotated entity type of the at least a portion of the plurality of entity types, the second annotated entity type comprising a second set of one or more attributes, wherein at least one attribute of the second set of one or more attributes differs from attributes of the first set of one or more attributes;

determine that the first annotated entity type is to be combined with the second annotated entity type in a first entity type of the physical data model;

read a conceptual data model to physical data model conversion annotation of the one or more conceptual data model to physical data model conversion annotations for the relationship, the conceptual data model to physical data model conversion annotation for the relationship indicating that the second annotated entity type will be generated in the physical data model as the first entity type;

based at least in part on the conceptual data model to physical data model conversion annotation for the relationship, create the first entity type in the physical data model; and create for the first entity type in the physical data model at least a portion of the first set of one or more attributes of the first annotated entity type and at least a portion of the second set of one or more attributes of the second annotated entity type, the at least a portion of the second set of one or more attributes comprising the at least one attribute of the second set of one or more attributes that differs from attributes of the first set of one or more attributes, whereby the first entity type in the physical data model represents a denormalized entity as compared with the first entity type and the second entity type in the conceptual data model.

20. The one or more computer-readable storage media of claim 19, wherein (1) the first annotated entity type is a parent entity type of the second annotated entity type and the relationship is associated with a conceptual data model to physical data model conversion annotation indicating that the parent entity type should be generated; or (2) first annotated entity type is a child entity type of the second annotated entity type and the relationship is associated with a conceptual data model to physical data model conversion annotation indicating that the child entity type should be generated.

* * * * *